US007680711B2

(12) United States Patent
Stephan et al.

(10) Patent No.: US 7,680,711 B2
(45) Date of Patent: Mar. 16, 2010

(54) PORTFOLIO MANAGEMENT EVALUATION

(75) Inventors: Thomas Stephan, Wedel (DE); Uwe Pein, Tornesch (DE); Thomas Ramseyer, Zürich (CH); Caroline Ryton, Zürich (CH); Alfred Wanka, Siegen (DE)

(73) Assignee: Accenture Global Services GmbH (CH)

( * ) Notice: Subject to any disclaimer, the term of this patent is extended or adjusted under 35 U.S.C. 154(b) by 1376 days.

(21) Appl. No.: 10/769,718

(22) Filed: Jan. 29, 2004

(65) Prior Publication Data

US 2005/0049951 A1 Mar. 3, 2005

Related U.S. Application Data

(60) Provisional application No. 60/498,889, filed on Aug. 29, 2003.

(51) Int. Cl.
*G06Q 40/00* (2006.01)
(52) U.S. Cl. ....................................................... 705/35
(58) Field of Classification Search ............... 705/36 R, 705/35
See application file for complete search history.

(56) References Cited

U.S. PATENT DOCUMENTS 6,389,400 B1 * 5/2002 Bushey et al. .................. 705/7
2002/0026429 A1 * 2/2002 Lostis et al. .................. 705/80
2003/0088489 A1 * 5/2003 Peters et al. .................. 705/36
2003/0110070 A1 * 6/2003 De Goeij ....................... 705/8
2003/0163357 A1 * 8/2003 Engleman et al. .............. 705/7
2005/0010469 A1 * 1/2005 Brown et al. .................. 705/10

OTHER PUBLICATIONS

Cavanah, Cassandra, "Consultant In A Box—computer software for small business", Apr. 1999, Entrepeneur, Entrepreneur Media, Inc.*
Business Editors, "Pacific Softworks Announces Investment and Strategic Alliance with RedFlag Inc.", Business Wire, New York: Jan. 25, 2000. p. 1.*
Porter, Michael, "The competitive Advantage", 1985, Free Press, Value Chain Figure.*
Grey, William; Katircioglu, Kaan; Bagchi, Sugato; Shi, Dailun et al.; "An analytic approach for quantifying the value of e-business initiatives". IBM Systems Journal; 2003; 42; 3; ABI/INFORM Global p. 484. Internet publication Jul. 17, 2003.*

* cited by examiner

*Primary Examiner*—James A Kramer
*Assistant Examiner*—Eric T Wong
(74) *Attorney, Agent, or Firm*—Brinks Hofer Gilson & Lione

(57) ABSTRACT

A method and software tool are provided for evaluating portfolio management. During an interview with an industry expert, weightings of evaluation categories and responses to evaluation questions are collected from the industry expert. The weightings and responses are then input into the software tool during the same meeting with the industry expert. The software tool analyzes the inputs and generates a report that is reviewable by the industry expert during the same meeting in which the weightings and responses are collected.

4 Claims, 39 Drawing Sheets

High Level Procedure

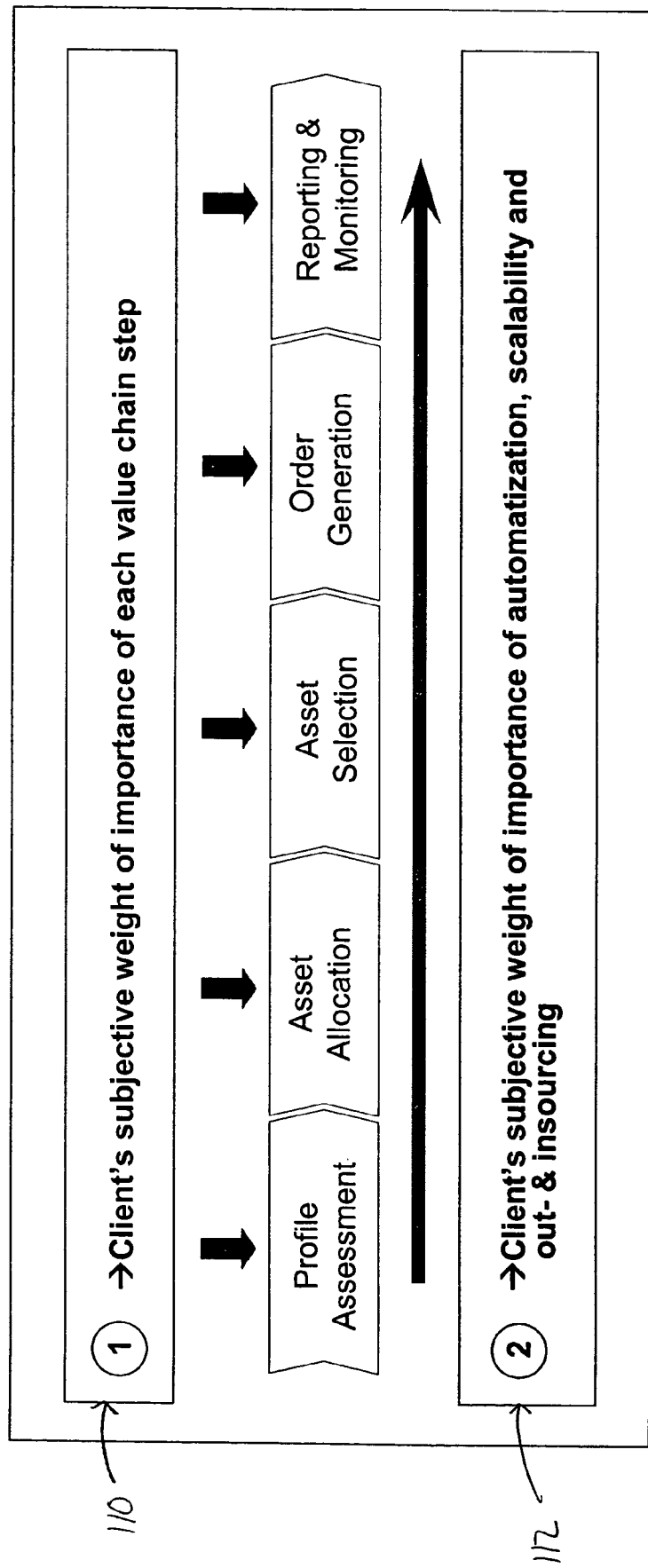

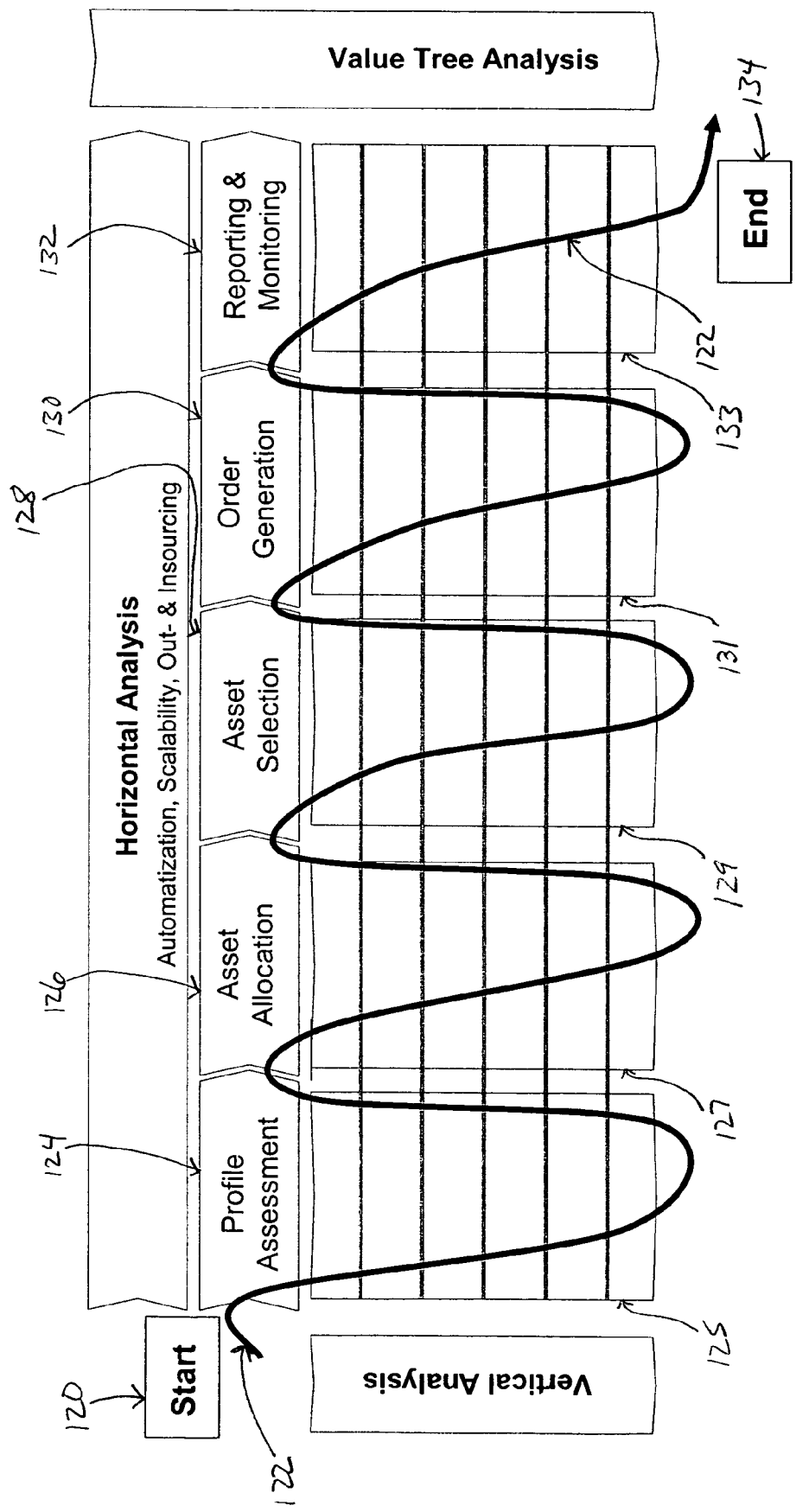

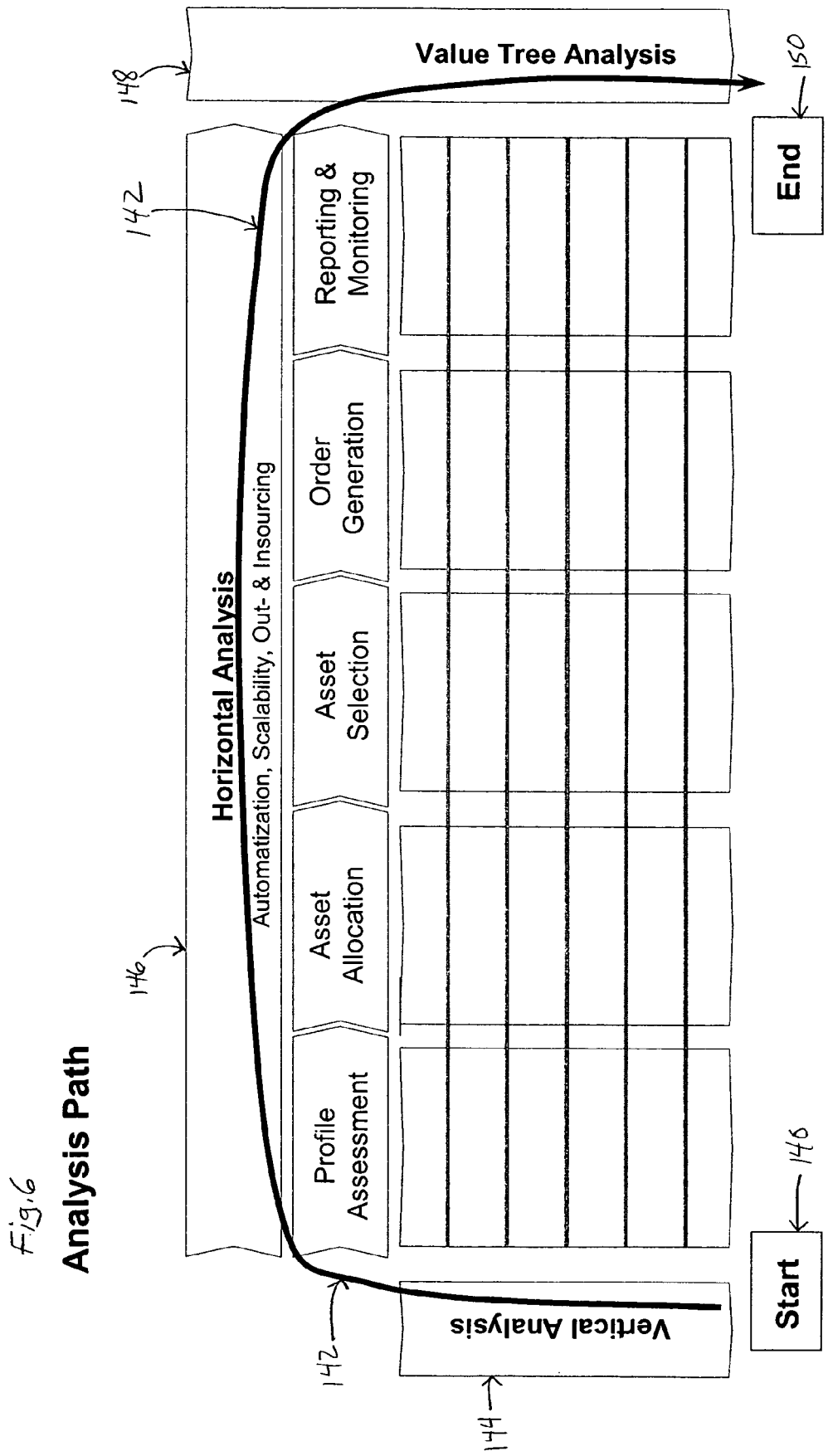
Fig. 6 Analysis Path

Fig. 7

Welcome to the Portfolio Management Healthcheck!

This tool is to help you analyze the "health" of your client company portfolio management process.

Scope
The identification of improvement potential within the portfolio management process along the value chain by comparing the current state with best practice.

Goals

Bank / Client
- Neutral evaluation
- Best practice insights
- Potential identification
- Solutions identification Accenture
- Client insight
- Benchmark information
- Opportunities
- Proposals

How?
Through different analyses along the value chain of the portfolio management process Value Tree Analysis Horizontal Analysis
Automatization, Scalability, Out- & Insourcing Profile Assessment | Asset Allocation | Asset Selection | Order Generation | Reporting & Monitoring Vertical Analysis Horizontal Analysis → Situation ← Value Tree Analysis
Vertical Analysis ↓

160 → (Scope)
162 → (Goals)
164 → (Vertical Analysis arrow)
166 → (Situation diagram)

Fig. 8A

Guide

This guide should help you in getting familiar with the tool. The below described 10 step process will help you using it in the most effective and efficient way.

Before bank / client meeting

Step 1: Read the "Guide" sheet in order to understand how you can get the most value out of the "Health Check".
Step 2: Read the "Welcome" sheet in order to get familiar with the three different dimensions of the analysis.
Step 3: On the "General Questions" sheet, answer all the questions for which you need no client interaction. They are marked with "acn".
This will require client research, plan time accordingly.
Step 4: Fill in the required information about the client and Accenture in the "Client Information" sheet.

During bank / client meeting
"Client Information" Sheet

Most of the information is acquired during the conversation with the client. The Accenture interviewer should be familiar with best practice within the portfolio management process in order to be able to rate the client appropriately. Whether the Accenture interviewer is entering the answers to the tool during or after the interview is not of any importance as long as the evaluations give a true picture of the client. Please note that all fields where data needs to be entered are highlighted in green.

Step 5: Enter the client's subjective rate of importance of each value chain step. This information will be considered during the analysis of the results.

Step 6: Enter the client's subjective rate of importance for automatization, scalability and out- & insourcing. This information will be considered during the analysis of the results.

Step 7: If additional useful information is given, please use the box for "comments" below.

"General Questions" Sheet

Step 8: Complete all the questions, which could not be answered prior to the interview.
This section should give Accenture a clearer picture on the client's current positioning in order to segment and cluster the client efficiently for the benchmark.

"Portfolio Assessment", "Asset Selection", "Asset Allocation", "Order Generation and Reporting & Monitoring" Sheet

Step 9: Fill in the evaluation for each question. A description on how the rating should be done is given at the end of each value chain step. The information captured will be automatically transferred into the result sheet where conclusions concerning the effectiveness and efficiency of the portfolio management process can be drawn. In order to go from one sheet to the other fell free to use the hyperlinked value chain on top. If desired, the client subjective rate of importance for each major question can be entered in the yellow column "Weight".

Step 10: In the "Additional Question" box at the bottom of the sheet, further questions to the client, which could be of importance for the analysis, can be included.

See Fig. 8B

Fig. 8B

"Result I", "Result II" and "Result III" Sheet

Result I: Vertical Analysis: For each value chain step, the rating of some key factors is shown graphically. The rating is always done compared to best practice. The delta between the rating and the level of importance attributed to the value chain step allows to identify areas for improvement.

Result II: Horizontal analysis: The horizontal analysis shows the level of the client company concerning automatization, scalability and out- & insourcing within the five different value chain steps graphically. The delta between the rating and the level of importance attributed to the three criteria allows to identify areas for improvement.

Result III: Value tree analysis: With the value tree analysis realized and unrealized potential within the portfolio management process is being shown graphically. Furthermore, possible solutions for increasing the realized potential are shown.

"Benchmark Summary"

The benchmark summary will be used for future benchmark studies.

"Analysis"

This sheet is a dynamic page which is used for the analysis of the gathered data.

See Fig. 8A 178
180
182

Fig. 9A

Client Information

| Client | |
|---|---|
| Client company name | |
| Bank segment | |
| Name of interview partner | |
| Position of interview partner | |
| Please include accordingly, if several interview partners | |
| Date | |
| Location | |
| Occasion | |
| Additional Information | |

← 190

| Accenture | |
|---|---|
| Accenture Interviewer | |
| Office | |
| Please include accordingly, if several interviewers | |

← 192

→ See Fig. 9B

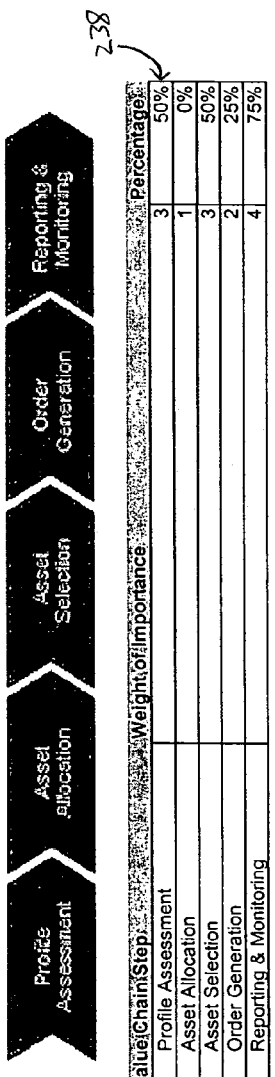

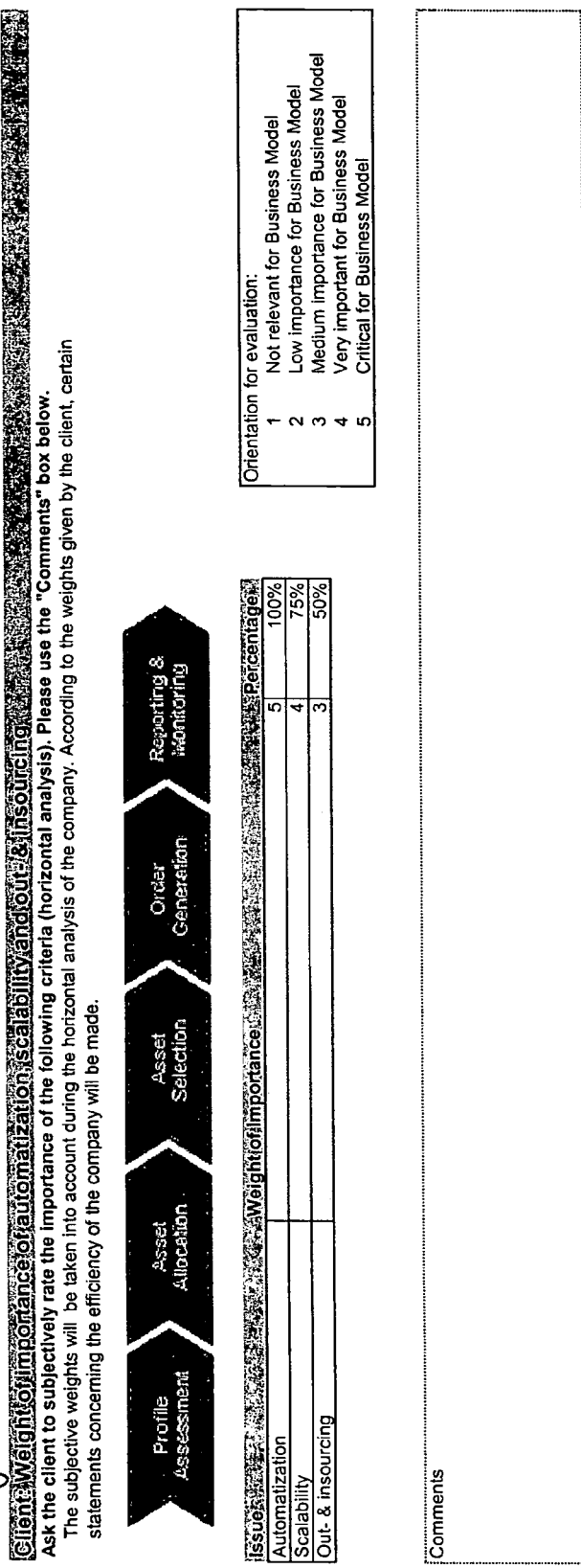

Fig. 10A

General Questions

This section is used for later efficient clustering and segmentation of the client company for benchmarking.

| Question | Source | Answer |
|---|---|---|
| How is the bank / client organized? | | |
| Do they have a private banking sector? | acn | |
| Do they have a family office? | acn | |
| Do they have an asset management department? | acn | |
| Does the bank have a research unit? | acn | |

Comments

| What products are they offering? What types of discretionary mandates are they offering? | | |
|---|---|---|
| Standard mandates | acn | |
| Special mandates (client individual weighting of asset classes and regions / industries) | acn | |
| Fund mandates | acn | |
| Other | int | | see Fig. 10B

Fig. 10B

See Fig. 10A ↑

| What types of advisory mandates are they offering? | |
|---|---|
| Active Advisory Mandates | acn |
| Advisory Mandates | acn |
| Administrative Mandates | acn |
| Other | int |
| | |
| What is the ratio between discretionary and administrative mandates? | acn/int |
| How many advisory mandates per relationship manager do they have? | acn |
| How many discretionary mandates per relationship / portfolio manager do they have? | acn |

Comments

208 →

| What is the structure of the assets? | |
|---|---|
| How much assets under management do they have? | acn |
| Private Banking | acn |
| Family Office | acn |
| Asset Management | acn |
| How many mandates do they have? | acn/int |
| Private Banking | acn/int |
| Asset Management | acn/int |
| What is the average size of a mandate? | acn/int |
| Private Banking | acn/int |
| Asset Management | acn/int |

See Fig. 10C ↓

Fig. 10C see Fig. 10B ↑

| Comments |
|---|

210 →

| Do you know how much each customer costs you in each value chain step? | |
|---|---|
| Profile Assessment | int |
| Asset Allocation | int |
| Asset Selection | int |
| Order Generation | int |
| Reporting & Monitoring | int |

| Comments |
|---| see Fig. 10D ↓

212 →

| Do you know how much you earn per customer in each value chain step? | |
|---|---|
| Profile Assessment | int |
| Asset Allocation | int |
| Asset Selection | int |
| Order Generation | int |
| Reporting & Monitoring | int |

Fig. 10D

See Fig. 10C →

214 → Distribution
| | |
|---|---|
| What is the relation of online / physical mail / personal contact distribution? | int |
| How high is IT-spending? (maintenance, development) | int |
| How long does it take you to introduce a new product on the market? | int |

Comments

216 → What kind of software solutions do you have?
| | |
|---|---|
| What backoffice software solution do you use? | int |
| Do you use a self-developed software solution ? | int |
| Do you use an externally bought software solution? If yes, which one? | int |

Comments int: Information captured during interview
acn: Information captured prior to the interview

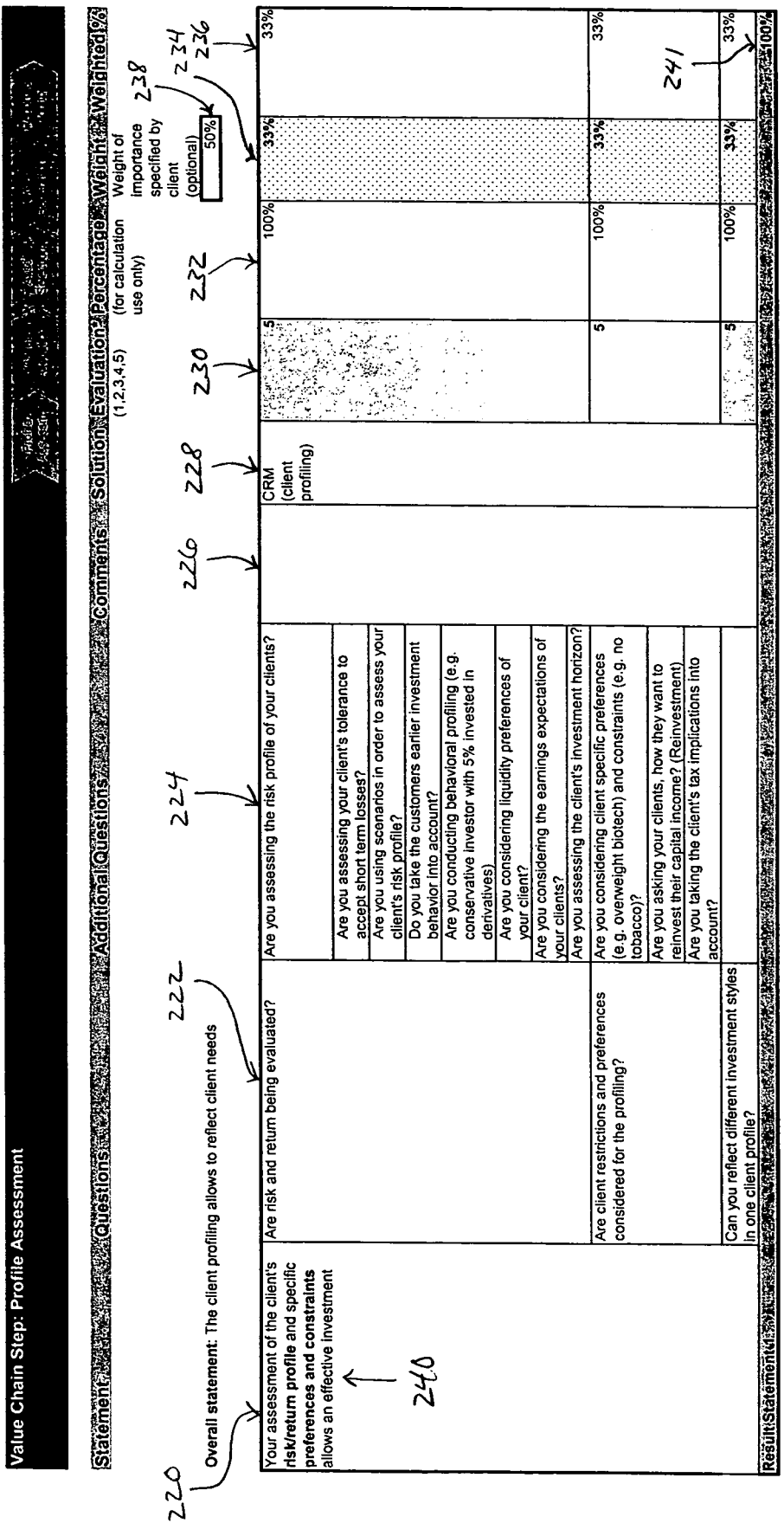

Fig. 11B

See Fig. 11A ↑

| | | | | | |
|---|---|---|---|---|---|
| Specific life-cycle events are considered ← 242 | Are personal events considered for the profiling? | Are you considering family planning? | CRM | | 0% | 100% | 0% ← 243 |
| | | Are you considering housing? | | | |
| | | Are you considering retirement? | | | |
| | | Are you considering succession? | | | |
| | | Are you considering other significant expenditures (car, boat, racing horse, etc.)? | | | |
| Result Statement 2 | | | | | 0% |
| You have a comprehensive capital value insight of your clients (share the valet) ← 244 | Do you take a holistic view on the clients financial situation? (real estate, stakes in businesses, art, life insurance, liquid assets, investment portfolios, income, regular spending, cash flow, taxation, expensive consumer goods (current and expensive consumer goods from other institutes and banks? | | CRM | 1 | 0% | 50% | 0% ← 245 |
| | Do you get capital insight from other institutes and banks? | | Stackbox | 2 | 25% | 50% | 13% |
| Result Statement 3 | | | | | 13% |
| The client insight allows you to maximize return ← 246 | Are you aware of how much you can earn with your clients (profitability)? | Do you know the costs generated by each activity you are performing? | ABC Improved Pricing | 2 | 25% | 50% | 13% ← 247 |
| | | Do you know how much of these activities your clients are consuming? | | | |
| | | Do you know with what activities you are providing value to your clients? | | | |
| | | Do you know for what services your clients have to pay? | | | |
| | | Are you adjusting the service level according to the turnover you generate with a customer? | | | |
| | Are you using cross-selling opportunities? | If yes, which ones? (Answer in Column | CRM | 3 | 50% | 50% | 25% |
| Result Statement 4 | | | | | 38% |
| You have reached a high level of automatization ← 248 | Do you consider your client profiling as being highly automated? | Which software solutions do you use? To what extent are these solutions being used? (Answer in Column "Comments") | Re-engineering | 3 | 50% | 100% | 50% ← 249 |
| Result Statement 5 | | | | | 50% |
| Your current process has a high degree of scalability ← 250 | Do you consider your client profiling process as being highly scalable? | | Re-engineering | 4 | 75% | 100% | 75% ← 251 |
| Result Statement 6 | | | | | 75% |
| Your client profile is being reassessed periodically ← 252 | How frequently are you reassessing your client's profile? | Is performance data used for reassessing the profile? | CRM | 2 | 25% | 100% | 25% ← 253 |
| | | Do you reassess the profile periodically according to the life stage? | | | |
| Result Statement 7 | | | | | 25% |

See Fig. 11C ↓

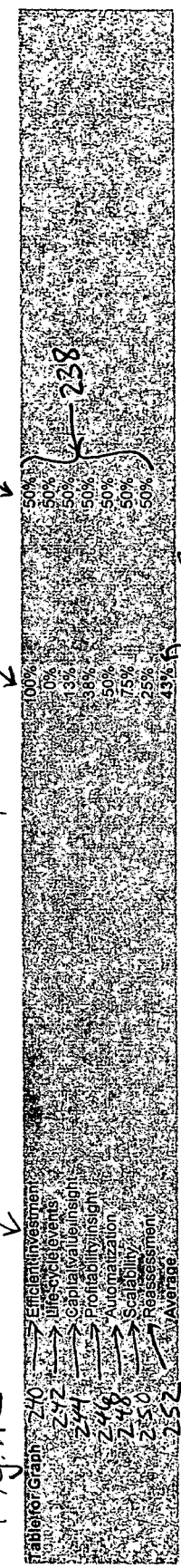

See Fig. 12A ↑

| | | | | | | |
|---|---|---|---|---|---|---|
| Your asset allocation decisions contribute to an above average performance and are efficient | To what extent would you agree with the statement that your Strategical Asset Allocation and Tactical Asset Allocation processes contribute to an above average return? | How would you rate the quality of your internal research? | | 3 | 50% | 20% | 10% |
| | | Are you using third party research? | Third Party Research | 3 | 50% | 20% | 10% |
| | Does the liberty you give to your portfolio managers lead to a higher portfolio performance? | If yes, are you able to measure the improvment? | Reengineering (no AA decisions by PM) Training | 3 | 50% | 20% | 10% |
| | | | | 4 | 75% | 20% | 15% |
| | Are you considering the diversification attributes and types of the asset allocation?<br>- markets<br>- sectors | | PMS (incl. Risk Mgmt) | | | | |
| | Are you using simulation models? | How would you assess the quality of your models? | Simulation Tools Reengineering of Asset Allocation Process | 5 | 100% | 20% | 20% |
| | Are you considering alternative investments and structured products in your asset allocation? | Are you considering Hedge Funds? | | 2 | 25% | 20% | 5% |
| | | Are you considering Seperate Accounts? | | | | | |
| | | Are you considering Private Equity? | | | | | |
| Result Statement 2 | | | | | | | 60% |
| You have considered in-outsourcing options ← 336 | Have you considered in-and outsourcing options? | Are you considering the asset allocation as one of your core competencies? | | 4 | 75% | 100% | 75% |
| | | Have you already considered selling your asset allocation to third parties? | insourcing | | | | |
| | | Have you already considered buying your asset allocation from third parties? | outsourcing | | | | |
| Result Statement 3 | | | | | | | 75% |
| You have reached a high level of automatization ← 322 | Do you consider your asset allocation process as being highly automated? | Are you able to generate an asset allocation, which is based on the client profile, online? | CRM/PM Tool Process Reengineering | 4 | 75% | 100% | 75% |
| | | What is the level of manual intervention, if the weights of the asset allocation need to be modified? | | | | | |
| | | Which software solutions do you use? To what extent are these solutions being used? (Answer in Column "Comments") | | | | | |
| Result Statement 4 | | | | | | | 75% |

See Fig. 12C ↓

Fig. 13A

Value Chain Step: Asset Selection

| Statements | Questions | Additional Questions | Comments | Solution | Evaluation (1,2,3,4,5) | Percentage (for calculation use only) | Weight Weight of importance specified by client (optional) 50% | Weighted % |
|---|---|---|---|---|---|---|---|---|
| Overall statement: The asset selection generates an efficient return / risk structure taking the client profile into account. | | | | | | | | 100% |
| The asset selection takes the client profile into account | Does your asset selection take the client profile into account? | Are you taking the client's risk tolerance into consideration? i.e. comparison between risk tolerance and risk parameters (VaR, Beta, Modified Duration, etc.) | | CRM/PM Tool | 5 | 100% | 100% | |
| | | Are you taking the client's investment horizon into consideration? Example: Alignment of time horizon and duration (portfolio immunization) | | | | | | |
| | | Does your asset selection reflect whether the client is looking for growth or income? | | | | | | |
| | | Are you taking tax aspects into consideration? (e.g. municipal bonds vs. corporate bonds for US | | | | | | |
| | | Are you taking client constraints and preferences into account? | | | | | | |
| Result Statement 1: | | | | | | | | 100% |
| High research quality allows you to generate an above average investment performance (bottom-up securities selection) | Does your research allow you to generate above market returns? | To what extent would you agree with the statement that your fundamental research allows to generate above market returns? | | Training Hiring | 3 | 50% | 100% | 50% |
| | | To what extent would you agree with the statement that your technical research allows to generate above market returns? | | | | | | |
| | | How independent is research from banking decisions? | | | | | | |
| | | Are you using external research? | | External Research | | | | |
| Result Statement 2: | | | | | | | | 50% |

See Fig. 13B

Fig. 13B

See Fig. 13A ↑

| | | | | | |
|---|---|---|---|---|---|
| The quality of your risk management (diversification) optimizes the efficiency of the portfolio (top down security selection) | Are you considering the impact of diversification when selecting securities? | Are you calculating the impact on the variance (risk) and the return? | PMS (incl. Risk Mgmt) | 4 | 75% | 50% | 38% |
| | | Are you calculating the impact on the VaR (Value at Risk)? | | | | |
| | | Are you using portfolio models? | | | | |
| | Are you considering hedging transactions for reducing the exposure? | | | 2 | 25% | 50% | 13% |
| Result Statement 3 | | | | | | 50% |
| Asset Selection reflects customer interests | Are you offering your clients third party products? | Do you actively sell them (based on success of PM, past performance, etc.)? | Open Product Platform | 4 | 75% | 50% | 38% |
| | Are you using funds for asset classes with small weights? | | | 5 | 100% | 50% | 88% |
| Result Statement 4 | | | | | | 88% |
| Your asset selection process is efficiently organized | Is your asset selection process centralized? (i.e. who is performing the asset selection - portfolio manager, | | Reengineering | 2 | 25% | 100% | 25% |
| Result Statement 5 | | | | | | 25% |
| You have considered in-outsourcing options | Have you considered in-and outsourcing options? | Are you considering the asset selection as one of your core competencies? | | 1 | 0% | 100% | 0% |
| | | Have you already considered selling your asset selection to third parties? | insourcing | | | |
| | | Have you already considered buying your asset selection from third parties? | outsourcing | | | |
| Result Statement 6 ←338 | | | | | | 0% |
| You have reached a high level of automatization ←324 | Do you consider your asset selection as being highly automated? | Is your asset selection process supported by model portfolios? | CRM/PM Tool | 2 | 25% | 100% | 25% |
| | | Are you able to generate an asset selection (investment proposal), which is based on the client portfolios? | | | | |
| | | Which software solutions do you use? To what extent are these solutions being used? (Answer in Column "Comments") | | | | |
| Result Statement 7 | | | | | | 25% |

See Fig. 13C ↓

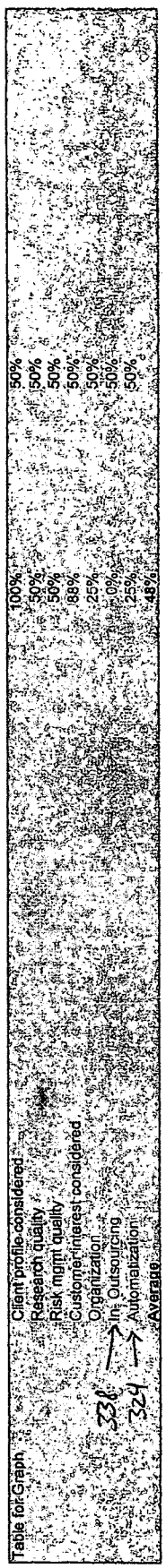

Fig. 14B

See Fig. 14A ↑

| | | | | | | |
|---|---|---|---|---|---|---|
| Bottom-up order generation (for single instruments) can be done efficiently for groups of portfolios (automatization) | Does your portfolio management system allow you to generate portfolio specific orders based on predefined criteria? | Does it allow you to specify a given quantity to buy / sell? | PMS | | 50% | 25% |
| | | Does it allow you to specify a % of the portfolio you want to buy / sell? | | | | |
| | | Does it allow you to specify a given target quantity in the portfolio? | | | | |
| | | Does it allow you to specify a target % of the portfolio? | | | | |
| | | Does it allow you to switch instruments (buy instr. A and sell instr. B) | | | | |
| | Does your portfolio management system allow you to allocate a global order to individual portfolios according to different criteria? | Does it allow you to make an allocation according to the portfolio market value? | | 3 | 50% | 25% |
| | | Does it allow you to make an equal percentage allocation? | | | | |
| | | Does it allow you to make an allocation according to existing positions (for sell)? | | | | |
| Result:Statement2: | | | | | | 50% |
| Top-down order generation (for groups of instruments) can be done efficiently for single portfolios | Is your portfolio management system capable of generating orders based on a comparison between the actual positions and the model portfolio? | | PMS | 4 | 75% | 38% |
| | Is your portfolio management system capable of generating orders based on a recommendation list? | | | 3 | 50% | 25% |
| Result:Statement3: | | | | | | 63% |
| Top-down order generation (for groups of instruments) can be done efficiently for groups of portfolios (automatization) | Is your portfolio management system capable of generating orders for a group of portfolios, based on a comparison between the actual positions and the model portfolio? | | PMS | 3 | 50% | 25% |
| | Is your portfolio management system capable of generating orders for a group of portfolios, based on a recommendation list? | | | 2 | 25% | 13% |
| Result:Statement4: | | | | | | 38% |

See Fig. 14C ↓

Fig. 14C

See Fig. 14B ↑

| Efficient order processing | How efficient is your order processing? | Are you aggregating single orders to block<br>Are you netting buy and sell transactions?<br>Are block orders automatically allocated to portfolios?<br>Are you optimizing your order size to prevent market influence? | PMS/OMS | | 0% | 100% | 0% |
|---|---|---|---|---|---|---|---|
| Result: Statement 5: | | | | | | | 0% |
| You have reached a high level of automatization ← 326 | What is the level of manual intervention in your order generation process (for modifying the price, quantity, etc.)? | Which software solutions do you use? To what extent are these solutions being used? (Answer in Column "Comments") | | 4 | 75% | 100% | 75% |
| Result: Statement 6: ← 330 | | | | | | | 87.5% |
| You have a high degree of scalability ← 332 | Do you consider your current solution as being highly scalable? | | | 3 | 50% | 100% | 50% |
| Result: Statement 7: | | | | | | | 50% |

Table for Graph
- Bottom-up/single portf. — 75% — 25%
- Bottom-up/group of portf. — 50% — 25%
- Top-down/single portf. — 63% — 25%
- Top-down/group of portf. — 38% — 25%
- Netting — 0% — 25%
- 326 → Automatization — 75% — 25%
- 332 → Scalability — 50% — 25%
- Average — 50% — 25%

Additional Questions:
In this section questions of interest and answers which could not be stated in the questionnaire are to be included
Questions & Comments How to do the evaluation appropriately: The interviewer has to make sure he is evaluating the client concerning each particular question according to best practice.
1: Not considered within firm
2: Client's level low
3: Client's level medium
4: Client's level above average
5: Client's level best practice

Fig. 15A

Value Chain Step:
Reporting & Monitoring

| Statement | Questions | Additional Questions | Comments | Solution | Evaluation (1,2,3,4,5) | Percentage (for calculation use only) | Weight Weight of importance specified by client (optional) 75% | Weighted % |
|---|---|---|---|---|---|---|---|---|
| Client Reporting | | | | | | | | |
| You are having a comprehensive client reporting | Are you using multiple channels to keep your customers informed? | Are you using mailing? | | Reporting Tool | 2 | 25% | 10% | 3% |
| | | Are you using the internet? | | | 3 | 50% | 10% | 5% |
| | Are you providing information on the actual holdings? | ...on the portfolio market value? | | | | | | |
| | | ...on the market value of asset classes, regions, sectors, time to maturity buckets? | | | | | | |
| | | ...on positions (mkt value, buy price, current price, Beta, duration, etc.)? | | | 4 | 75% | 10% | 8% |
| | Are you providing information on the transactions that took place during the reporting period? | | | | | | | |
| | Are you making a liquidity projection? | | | | 2 | 25% | 10% | 3% |
| | Are you providing information on the performance? | ... on the portfolio performance? | | | 4 | 75% | 10% | 8% |
| | | ... on the performance of asset classes, regions, sectors, time to maturity buckets? | | | | | | |
| | | ... on positions? | | | | | | |
| | | ... by comparing against the benchmark? | | | | | | |
| | | ... by making a performance attribution (market timing, stock picking, cross effect)? | | | | | | |
| | | ... by differentiating between before and after tax performance? | | | | | | |
| | | ... by considering speculation tax? | | | | | | |
| | | ... by differentiating between before and after fee performance? | | | | | | |
| | Are you able to aggregate accounts? | | | | 1 | 0% | 10% | 0% |
| | Are you able to split funds? | | | | 2 | 25% | 10% | 3% |
| | Are you pointing out risk factors? | | | | 3 | 50% | 10% | 5% |
| | Are you using charts to illustrate the results? | | | | 4 | 75% | 10% | 8% |
| | Are you using text to support the results? | | | | 5 | 100% | 10% | 10% |
| Result Statement | | | | | | | | 50% | see Fig. 15B

Fig. 15B see Fig. 15A ↑

| | | | Reporting Tool | | 75% | 50% | 38% |
|---|---|---|---|---|---|---|---|
| You are having a customized client reporting | Are you able to define the report content and frequency based on customer requirements? | | | 4 | | 50% | |
| | Are you providing the customer with research material which corresponds to | | | 3 | 50% | 50% | 25% |
| Result Statement 2: | | | | | | | 63% |
| Your client reporting assures profitability | Are your reporting price schedules in line with the income generated with a | | Pricing / Fee Model | 2 | 25% | 100% | 25% |
| Result Statement 3: | | | | | | | 25% |
| Internal Monitoring | | | | | | | |
| You are having an effective and efficient compliance monitoring | Are you able to monitor the investments of the portfolio managers? | Are you able to control whether defined asset allocations are respected? | PMS | 2 | 25% | 50% | 13% |
| | | Are you able to control whether defined model portfolios are respected? | | | | | |
| | | Are you able to control whether defined client, bank and legal constraints are respected? | | | | | |
| | Is the level of manual intervention in your compliance controlling low? | | | 4 | 75% | 50% | 38% |
| Result Statement 4: | | | | | | | 50% |
| You are having an effective and efficient performance monitoring | Are you able to assess the performance of the tactical asset allocation committee (by comparing against the strategical asset allocation)? | | PMS | 3 | 50% | 25% | 13% |
| | Are you able to assess the performance of the portfolio managers? | | | 3 | 50% | 25% | 13% |
| | Are you able to make a performance attribution (market timing, stock picking, cross effect)? | | | 2 | 25% | 25% | 6% |
| | Are you able to measure performance at different levels (portfolio, asset allocation, position)? | | | | | | |
| | What is the level of manual intervention in your performance monitoring? | | | 4 | 75% | 25% | 19% |
| Result Statement 5: | | | | | | | 50% |
| Comprehensive Statements | | | | | | | |
| You have considered in- and outsourcing options ← 340 | Have you considered in-and outsourcing options? | Are you considering reporting as one of your core competencies? | | 1 | 0% | 100% | 0% |
| | | Have you already considered selling your reporting capabilities to third parties? | insourcing | | | | |
| | | Have you already considered buying your reporting capabilities from third parties? | outsourcing | | | | |
| Result Statement 6: | | | | | | | 0% | see Fig. 15C ↓

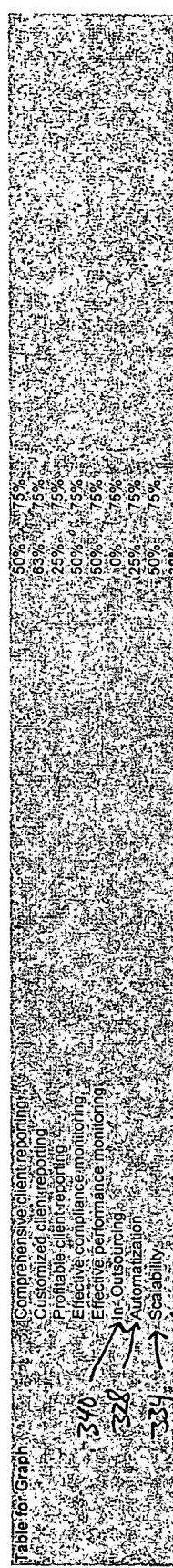

Fig. 19

Benchmark

| | Data Capture | Benchmark |
|---|---|---|
| Profile Assessment | | |
| Efficient investment | 100% | |
| Consideration of life-cycle events | 0% | |
| Capital value insight | 13% | |
| Profitability insight | 38% | |
| Automatization level | 50% | |
| Scalability | 75% | |
| Reassessment | 25% | |
| Asset Allocation | | |
| Client profile considered | 25% | |
| AA leads to above mkt performance | 60% | |
| In- Outsourcing options considered | 75% | |
| Automatization level | 75% | |
| Asset Selection | | |
| Client profile considered | 100% | |
| Level of research quality | 50% | |
| Level of risk mgmt quality | 50% | |
| Customer interest considered | 88% | |
| Efficient organization | 25% | |
| In- Outsourcing options | 0% | |
| Automatization level | 25% | |
| Order Generation | | |
| Bottom-up / single portfolios | 75% | |
| Bottom-up / group of portfolios | 50% | |
| Top-down / single portfolios | 63% | |
| Top-down / group of portfolios | 38% | |
| Order Processing | 0% | |
| Automatization level | 75% | |
| Scalability | 50% | |
| Reporting & Monitoring | | |
| Comprehensive client reporting | 50% | |
| Customized client reporting | 63% | |
| Profitable client reporting | 25% | |
| Effective compliance monitoring | 50% | |
| Effective performance monitoring | 50% | |
| In- Outsourcing options | 0% | |
| Automatization level | 25% | |
| Scalability | 50% | |

Fig. 20A

Value Tree

Data for Graph

Increase AuM ← 350

| Value Chain Step | Statement ← 402 | Evaluation ← 404 | | Key Services/Competences ← 406 |
|---|---|---|---|---|
| Profile Assessment | Risk/Return profile, preferences & constraints | 100% | 100% | Client Profiling |
| | Life Cycle Events | 0% | 100% | |
| | Capital Value Insight | 13% | 100% | |
| | Performance Data used for reassessment | 25% | 100% | |
| Asset Allocation | Customer profile used for AA | 25% | 100% | Risk/Return Ratios |
| | Above average performance | 60% | 100% | |
| Asset Selection | Client profile taken into account | 100% | 100% | Client Profiling |
| | High research quality | 50% | 100% | Risk/Return Ratios |
| | Risk management (diversification) | 50% | 100% | |
| | Customer interests | 88% | 100% | Client Service |
| Reporting & Monitoring | Comprehensive reporting | 50% | 100% | |
| | Customized reporting | 63% | 100% | |
| | Compliance Monitoring | 50% | 100% | |
| | Performance Monitoring | 50% | 100% | |
| | | 723% ← 408 | 1400% | |
| | | 52% ← 410 | 48% ← 360 | |

Improve Pricing ← 352

| | | | | |
|---|---|---|---|---|
| Profile Assessment | Client Insight / Maximize returns | 38% | 100% | Pricing / Fee Model |
| Reporting & Monitoring | Profitable reporting | 25% | 100% | |
| | | 63% | 200% | |
| | | 31% | 69% ← 362 | |

See Fig. 20B

Fig. 20B — see Fig. 20A ↑ 354

Decrease Operation Expense

| | | | | |
|---|---|---|---|---|
| Profile Assessment | Automatization | 50% | 100% | Banking Efficiency |
| | Scalability | 75% | 100% | |
| Asset Allocation | Automatization | 75% | 100% | |
| Asset Selection | Efficient organization | 25% | 100% | |
| | Automatization | 25% | 100% | |
| Order Generation | Bottom-up / single portfolios | 75% | 100% | |
| | Bottom-up / group of portfolios | 50% | 100% | |
| | Top-down / single portfolios | 63% | 100% | |
| | Top-down / groups of portfolios | 38% | 100% | |
| | Order processing | 0% | 100% | |
| | Automatization | 75% | 100% | |
| | Scalability | 50% | 100% | |
| Reporting & Monitoring | Automatization | 25% | 100% | |
| | Scalability | 50% | 100% | |
| | | 675% | 1400% | |
| | | 48% | 52% | ← 364 |

Improve Capital Efficiency ← 356

| | | | | |
|---|---|---|---|---|
| Asset Allocation | In-outsourcing | 75% | 100% | Focused Operating Model |
| Asset Selection | In-outsourcing | 0% | 100% | |
| Reporting & Monitoring | In-outsourcing | 0% | 100% | |
| | | 75% | 300% | |
| | | 25% | 75% | ← 366 |

↓ see Fig. 20C

Fig. 20C

| Data for Improvement Potential and Key Drivers | | | |
|---|---|---|---|
| Effectivity | Min | Max | ← 436 |
| 420 → 60% | 75% | 100% | High Level Client Service ← 370 |
| | 50% | 75% | Medium Level Client Service |
| | 0% | 50% | Low Level Client Service |
| 422 → 48% | 75% | 100% | Highly Sophisticated Client Profiling |
| | 50% | 75% | Semi Sophisticated Client Profiling ← 372 |
| | 0% | 50% | Little Sophisticated Client Profiling |
| 424 → 46% | 75% | 100% | High Return / Risk Ratios ← 374 |
| | 50% | 75% | Medium Return / Risk Ratios |
| | 0% | 50% | Low Return / Risk Ratios |
| 426 → 51% Total | | | ← 376 |
| 428 → 31% | 75% | 100% | Sophisticated Pricing / Fee Model |
| | 50% | 75% | Semi Sophisticated Pricing / Fee Model |
| | 0% | 50% | Little Sophisticated Pricing / Fee Model |
| 430 → 48% | 75% | 100% | High Banking Efficiency |
| | 50% | 75% | Medium Banking Efficiency ← 378 |
| | 0% | 50% | Low Banking Efficiency |
| 432 → 25% | 75% | 100% | Highly Focused Operating Model ← 380 |
| | 50% | 75% | Semi Focused Operating Model |
| | 0% | 50% | Little Focused Operating Model |
| | | | High ← 363 |
| | | | Medium ← 361 |
| | | | Low |

434 ← See Fig. 20B

See Fig. 20D

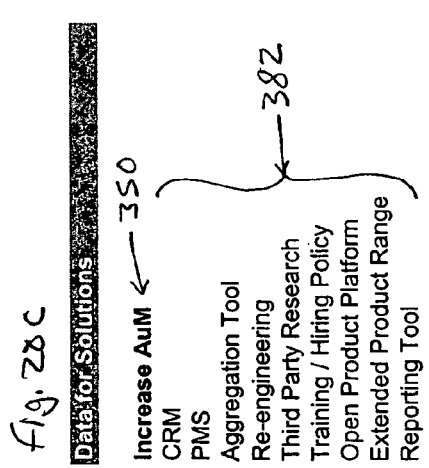

| Data for Solutions ← 350 | |
|---|---|
| Increase AuM | |
| CRM | |
| PMS | |
| Aggregation Tool | |
| Re-engineering | ← 382 |
| Third Party Research | |
| Training / Hiring Policy | |
| Open Product Platform | |
| Extended Product Range | |
| Reporting Tool | |
| Improve Pricing ← 352 | |
| CRM | ← 384 |
| Pricing / Fee Model | |
| Decrease Cost ← 354 | |
| CRM | |
| PMS | ← 386 |
| Re-engineering | |
| Improve Capital Efficiency ← 356 | |
| Consider In-Outsourcing Options ← 388 | |

Fig. 20 D

*See Fig. 20C*

Data for Graph

| | | Weight | |
|---|---|---|---|
| Automatization | | | 100% |
| 248 → Profile Assessment | | 50% | 100% |
| 322 → Asset Allocation | | 75% | 100% |
| 324 → Asset Selection | | 25% | 100% |
| 326 → Order Generation | | 75% | 100% |
| 328 → Reporting | | 25% | 100% |
| Average | | 50% | |

← 301

196

| | | | 196 |
|---|---|---|---|
| Scalability | | | 75% |
| Profile Assessment | | 75% | 75% |
| Order Generation | | 50% | 75% |
| Reporting & Monitoring | | 50% | 75% |
| Average | | 58% | |

| | | | 196 |
|---|---|---|---|
| Out- Insourcing | | | 50% |
| Asset Allocation | | 75% | 50% |
| Asset Selection | | 0% | 50% |
| Reporting & Monitoring | | 0% | 50% |
| Average | | 25% | |

PORTFOLIO MANAGEMENT EVALUATION

BACKGROUND

This application claims priority under 35 U.S.C. §119(e) to provisional application number 60/498,889 by Stephan et al. and entitled Portfolio Management Evaluation, filed Aug. 29, 2003, which is hereby incorporated by reference herein.

The present invention relates generally to portfolio management, and particularly to evaluating portfolio management through interviewing an industry expert and analyzing interview data.

As those in the art recognize, portfolio management generally refers to the management of a financial portfolio and can involve managing a portfolio of stocks, bonds, money market funds, currencies or other investments. As such, the portfolio management process applies to such diverse portfolio managers as public and private banks, asset managers, individual families and the like. The portfolio management process involves a number of steps that require regular evaluation to ensure that the process is functioning at a high performance level and as smoothly and cost effectively as possible. Often, portfolio managers rely upon consultants for assistance in identifying areas of needed improvement within the portfolio management process. Usually, a consultant has broad experience with the management process of particular types of portfolios and uses this knowledge to compare the portfolio manager's process to other related portfolio management processes. Based on the consultant's comparison between the portfolio management process being studied and other known related processes, the consultant typically identifies the weaknesses and strengths of the portfolio manager's process and recommends changes where needed to improve the process.

Traditionally, the consulting process requires several meetings with the portfolio manager in order to evaluate the portfolio management process and fully respond to the particular needs and opinions of the portfolio manager. For example, a typical consulting process begins with an initial identification and contact with the portfolio manager. The initial identification can occur in numerous ways that are well-known to those in consulting businesses, such as word of mouth, advertising, searches and the like. Once a contact has been made with a portfolio manager who is seeking assistance from a consultant, a first meeting is setup between the consultant and the portfolio manager.

During the first meeting between the portfolio manager and the consultant, the consultant typically asks the portfolio manager a number of questions about the portfolio management process in an informal manner. During this first question and answer session, the consultant will usually record the answers to the consultant's questions in any one of a variety of ways. The questions asked by the consultant, however, are usually generated specifically for the particular portfolio manager being asked the questions. Thus, the consultant's questions generally do not match the questions that may be asked of other portfolio managers.

After the consultant has collected a sufficient number of answers to the questions posed to the portfolio manager during the first meeting, the consultant takes the gathered information back to the consultant's office to evaluate the information. Typically, the evaluation of a portfolio management process at the consultant's office requires the input of several specialists. After completing the analysis of the portfolio management process, the consultant and the specialists prepare a series of customized reports that identify the strengths and weaknesses of the analyzed portfolio management process. However, the process of analyzing the collected information and preparing reports can take a significant amount of time to complete. Usually this process takes at least several days to finish but can take as long as a week or more.

Once the reports are completed, the consultant then typically arranges a second meeting with the portfolio manager. During the second meeting, the consultant presents the reports and the consultant's evaluation of the portfolio management process to the portfolio manger. During the presentation, the consultant usually identifies to the portfolio manager the strengths and weaknesses of the portfolio management process. In addition, the consultant may discuss with the portfolio manager possible solutions for improving the identified weaknesses. In the case where the consultant also represents a solution provider, the consultant may use this meeting to discuss specific solutions available from the solution provider. Thus, the consultant's second meeting with the portfolio manager may also serve a secondary purpose of providing an opportunity to sell additional services to the portfolio manager.

Although the consulting process described above is widely used by consultants in the consulting business, several problems exist with this process. One problem is the lack of involvement by the portfolio manager in the evaluation process and the time delay between the first meeting (data collecting) and the second meeting (reporting). Because the portfolio manager is not involved in the evaluation and preparation of the reports, the reports that are presented during the second meeting often lack credibility. This situation is compounded by the time delay required to analyze the portfolio manager's data and prepare the reports at the consultant's office. As a result, portfolio managers sometimes perceive the consultant's reports to be artificial and generic. Moreover, when the consultant also represents a service provider, the portfolio manager may be highly skeptical of the consultant's reports, further perceiving the reports as contrived and biased towards the solutions offered by the consultant. Although those perceptions are often inaccurate and unfair to the amount of work invested by the consultant, the lack of portfolio manager involvement and the time delays make these perceptions unavoidable and all too frequent.

Another problem that often occurs is miscommunication between the consultant and the portfolio manager. Because of the time delay between the first and second meetings with the portfolio manager, the consultant usually does not discover possible miscommunications until after the analysis is complete and the reports are presented during the second meeting. Unfortunately, sometimes the analysis and reports turn out to be unhelpful because either the consultant did not understand the portfolio manager's answers to the questions or the portfolio manager did not understand the questions. In any event, because the reports do not accurately reflect the portfolio management process, the portfolio manager is understandably dissatisfied with the consultant's efforts. As a result, the consultant loses an opportunity with the portfolio manager or the consultant must go back to the consultant's office to re-analyze the portfolio management process and prepare new reports. If the portfolio manager gives the consultant another opportunity to correct the problems with the reports, even more time is required with more analysis, reporting and meetings with the portfolio manager. This additional, time delay makes the consulting process inefficient and less effective.

In some situations, the portfolio manager may also seemingly change his/her mind about certain questions between the first and second meeting. This problem usually does not reflect an actual change in the portfolio manager's position (although sometimes it does). Instead, this problem is more reflective of the portfolio manager's uninvolvement in the evaluation process. Oftentimes, when the portfolio manager sees the reports that have been generated based on the answers provided. The portfolio manager decides that the previously provided answers were inaccurate or inexact. Although this may appear to be an inconsistency in the portfolio manager's positions, this is a common human technique for optimizing the results of an analysis and arriving at the most accurate results. However, because of the additional time that is required to re-analyze new answers and prepare new reports, changes such as this can be time consuming and expensive.

Consultants also do not have an effective way to incorporate the level of importance that a portfolio manager attributes to particular parts of the portfolio management process. Instead, consultants usually evaluate all parts of the portfolio management process equally, regardless of the importance of each part to the portfolio manager. As a result, the reports are sometimes unresponsive to the actual needs of the portfolio manager. This problem is compounded by the lack of involvement by the portfolio manager in the evaluation and time delays, both of which have been previously discussed.

Another problem is the unstructured nature of the question-answer session that occurs during the first meeting referred to above. Because the questions asked by the consultant serve the singular purpose of collecting data for reporting back to the portfolio manager, the collected data has limited usefulness beyond this singular purpose. Thus, since the questions that are asked usually do not match the questions asked of other portfolio managers, it would be cumbersome and expensive to compare the collected data from different portfolio managers. Another problem is that a consultant sometimes discovers during the first question and answer meeting that the consultant does not have the qualifications for a particular specialty needed by the portfolio manager. When this occurs, the consultant typically tries to identify another consultant with the qualifications needed by the portfolio manager. However, when this occurs, the first meeting with the first consultant is usually wasted because the second consultant must start over with his/her own questions during the new first meeting.

Because of these and other numerous problems, a better consulting process is needed for portfolio management.

BRIEF SUMMARY

Accordingly, a method of evaluating portfolio management and a software tool are provided. The method of evaluating portfolio management involves collecting weightings of evaluation categories and responses to evaluation questions during an interview. Contemporaneously, the weightings and responses are input into the software tool. The software tool then analyzes and generates a report that may be reviewed by an industry expert during the same meeting in which the weightings and responses are collected. The weightings and responses may also be adjusted to compare different scenarios. Additional aspects of the invention are also described and claimed below.

BRIEF DESCRIPTION OF SEVERAL VIEWS OF THE DRAWINGS

The invention is illustrated in the drawings, in which:
FIG. 4 is a diagram of a consultancy process, showing a client providing weightings for categories;
FIG. 5 is a diagram of a consultancy process, showing an interview path;
FIG. 6 is a diagram of a consultancy process, showing an analysis path;
FIG. 7 is a screen display of a computerized tool, showing a welcome sheet;
FIGS. 8A-8B is a screen display of the computerized tool, showing a guide sheet;
FIGS. 9A-9C is a screen display of the computerized tool, showing a client information sheet;
FIGS. 10A-10D is a screen display of the computerized tool, showing a general questions sheet;
FIGS. 11A-11C is a screen display of the computerized tool, showing a profile assessment sheet;
FIGS. 12A-12C is a screen display of the computerized tool, showing an asset allocation sheet;
FIGS. 13A-13C is a screen display of the computerized tool, showing an asset selection sheet;
FIGS. 14A-14C is a screen display of the computerized tool, showing an order generation sheet;
FIGS. 15A-15C is a screen display of the computerized tool, showing a reporting & monitoring sheet;
FIG. 19 is a screen display of the computerized tool, showing a benchmark sheet;
FIGS. 20A-20D is a screen display of the computerized tool, showing an analysis sheet;

DETAILED DESCRIPTION

Figure 1:
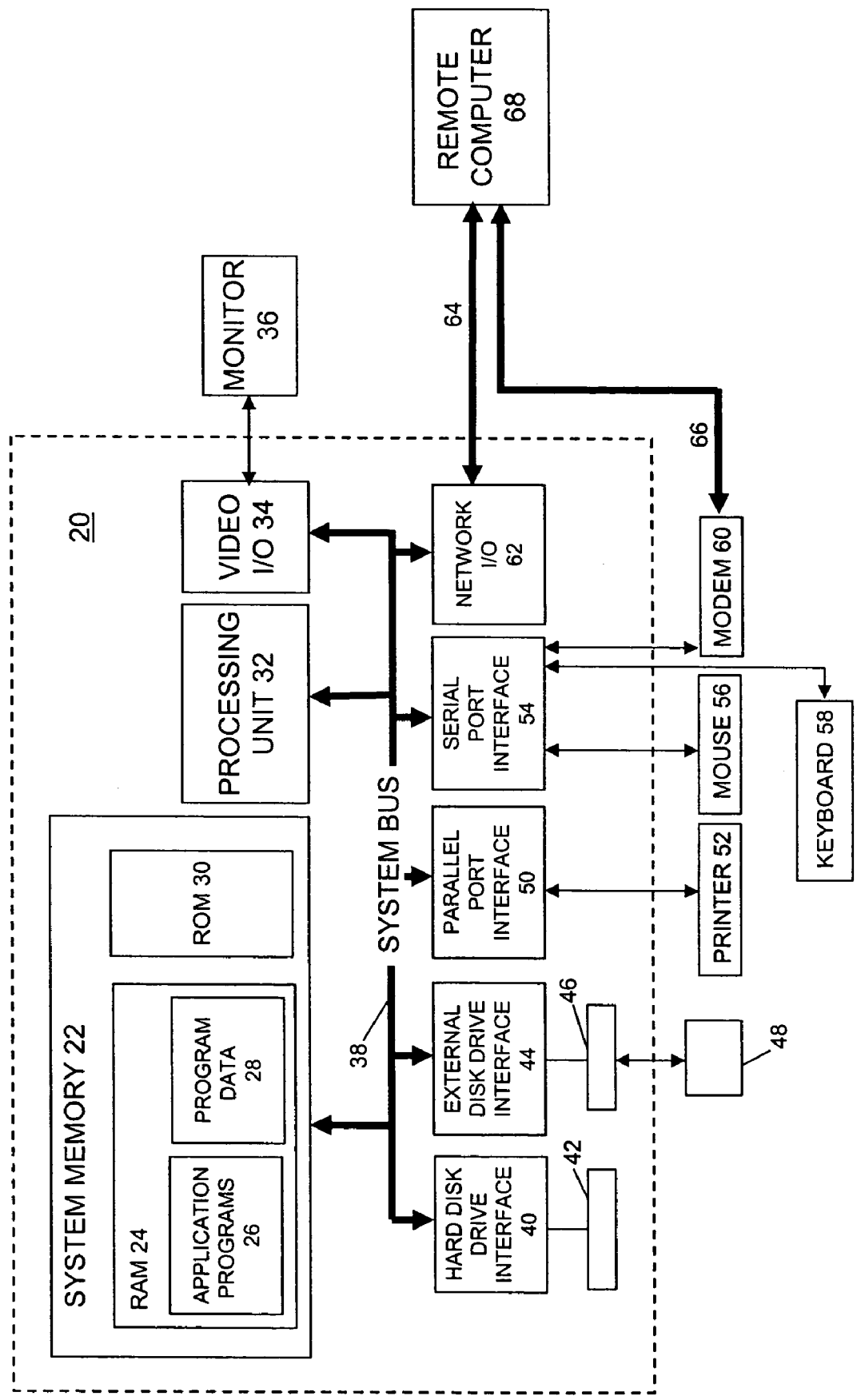
FIG. 1 is a schematic of a computer system.

With reference to FIG. 1, an exemplary system for implementing the invention includes a general purpose computing device in the form of a conventional computing environment 20, including a processing unit 32, a system memory 22, and a system bus 38, that couples various system components including the system memory 22 to the processing unit 32. The processing unit 32 may perform arithmetic, logic and/or control operations by accessing system memory 22. The system memory 22 may store information and/or instructions for use in combination with processing unit 32. The system memory 22 may include volatile and non-volatile memory, such as random access memory (RAM) 24 and read only memory (ROM) 30. A basic inpuVoutput system (BIOS) containing the basic routines that helps to transfer information between elements within the personal computer 20, such as during start-up, may be stored in ROM 30. The system bus 38 may be any of several types of bus structures including a memory bus or memory controller, a peripheral bus, and a local bus using any of a variety of bus architectures.

The personal computer 20 may further include a hard disk drive 42 for reading from and writing to a hard disk (not shown), and an external disk drive 46 for reading from or writing to a removable disk 48. The removable disk may be a magnetic disk for a magnetic disk driver or an optical disk such as a CD ROM for an optical disk drive. The hard disk drive 42 and external disk drive 46 are connected to the system bus 38 by a hard disk drive interface 40 and an external disk drive interface 44, respectively. The drives and their associated computer-readable media provide nonvolatile storage of computer readable instructions, data structures, program modules and other data for the personal computer 20. Although the exemplary environment described herein employs a hard disk and an external disk 48, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 48, ROM 30 or RAM 22, including an operating system (not shown), one or more application programs 26, other program modules (not shown), and program data 28. The application programs may include the functionality as detailed in FIGS. 7-20D.

A user may enter commands and information, as discussed below, into the personal computer 20 through input devices such as keyboard 58 and mouse 56. Other input devices (not shown) may include a microphone (or other sensors), joystick, game pad, scanner, or the like. These and other input devices may be connected to the processing unit 32 through a serial port interface 54 that is coupled to the system bus, or may be collected by other interfaces, such as a parallel port interface 50, game port or a universal serial bus (USB). Further, information may be printed using printer 52. The printer 52, and other parallel input/output devices may be connected to the processing unit 32 through parallel port interface 50. A monitor 36 or other type of display device is also connected to the system bus 38 via an interface, such as a video input/output 34. In addition to the monitor, computing environment 20 may include other peripheral output devices (not shown), such as speakers or other audible output.

The computing environment 20 may communicate with other electronic devices such as a computer, telephone (wired or wireless), personal digital assistant, television, or the like. To communicate, the computer environment 20 may operate in a networked environment using connections to one or more electronic devices. FIG. 1 depicts the computer environment networked with remote computer 68. The remote computer 48 may be another computing environment such as a server, a router, a network PC, a peer device or other common network node, and may include many or all of the elements described above relative to the computing environment 20. The logical connections depicted in FIG. 1 include a local area network (LAN) 64 and a wide area network (WAN) 66. Such networking environments are commonplace in offices, enterprise-wide computer networks, intranets and the Internet.

When used in a LAN networking environment, the computing environment 20 may be connected to the LAN 64 through a network I/O 62. When used in a WAN networking environment, the computing environment 20 may include a modem 60 or other means for establishing communications over the WAN 66. The modem 60, which may be internal or external to computing environment 20, is connected to the system bus 38 via the serial port interface 54. In a networked environment, program modules depicted relative to the computing environment 20, or portions thereof, may be stored in a remote memory storage device resident on or accessible to remote computer 68. It will be appreciated that the network connections shown are exemplary and other means of establishing a communications link between the electronic devices may be used.

The above-described computing system is only one example of the type of computing system that may be used to implement the software tool described below. As those in the art will readily recognize, other computing systems may also be used instead of the system described above.

Figure 2:
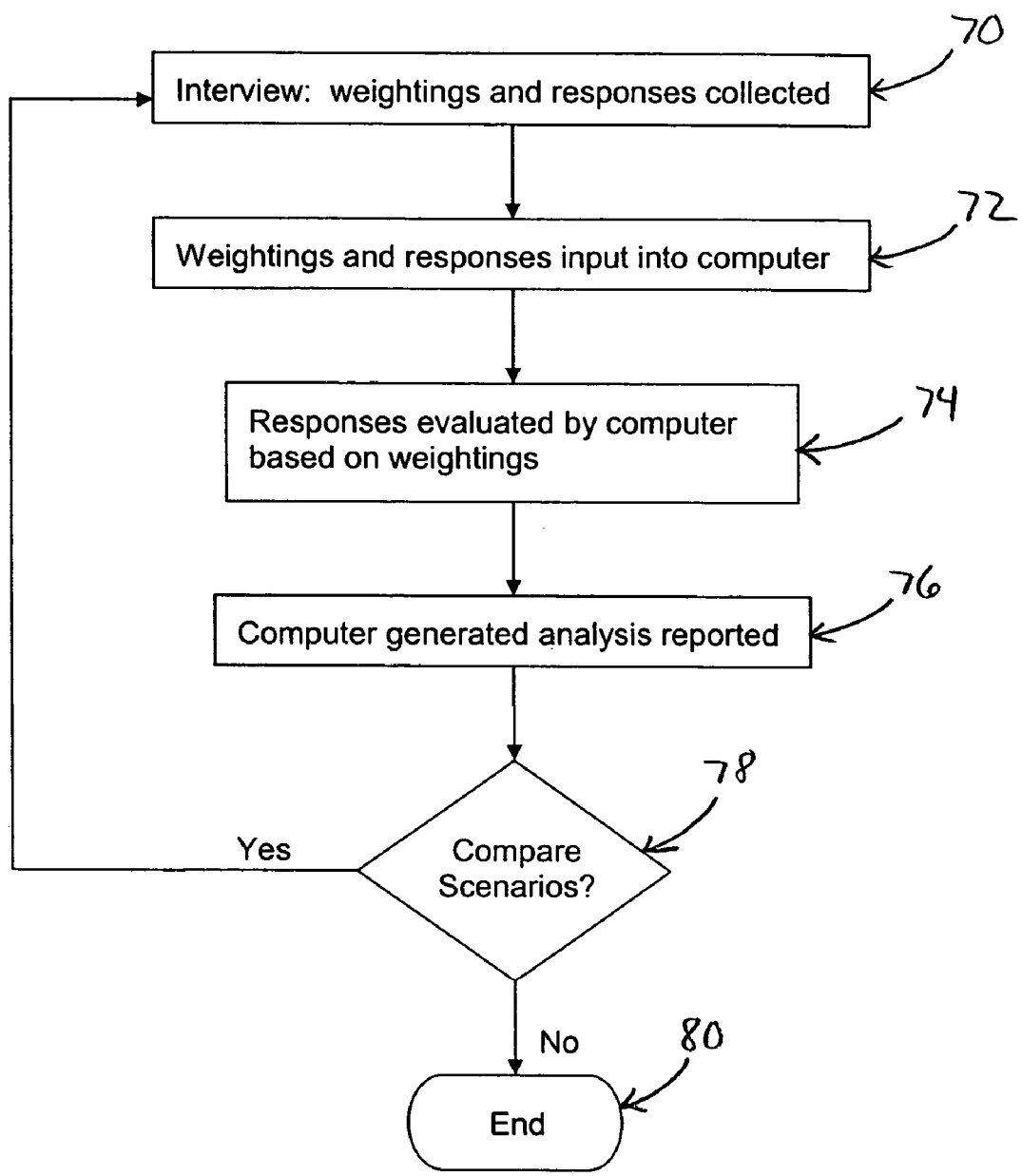
FIG. 2 is a flow chart of a method for evaluating a portfolio management process.

Turning now to FIG. 2, a flow chart of a method for evaluating a portfolio management process is shown. The method begins with an interview between a consultant and an industry expert (70). Usually, the industry expert will be a portfolio manager, but the industry expert could be any expert in a particular portfolio management industry. During the interview, the consultant collects weightings of a series of evaluation categories and responses to a series of evaluation questions (70). The consultant then inputs the weightings and responses received by the industry expert into a computerized tool designed to analyze the weightings and responses (72). Next, the computerized tool analyzes the responses to the evaluation questions based on the weightings given to the evaluation categories (74). The computerized tool also generates a report in response to the analysis (76). The report is then reported by the consultant to the industry expert during the same interview at which the weightings and responses are collected (76). After the industry expert reviews the report, the industry expert and/or consultant can suggest that various scenarios be compared by inputting different weightings and responses into the computerized tool (78). When no more scenarios are needed, the evaluation of the portfolio management process is complete (80). At this point the consultant may either wrap up the consulting job or may proceed to discuss possible solutions with the industry expert if any weaknesses in the portfolio management process were identified in the report.

Figure 3:
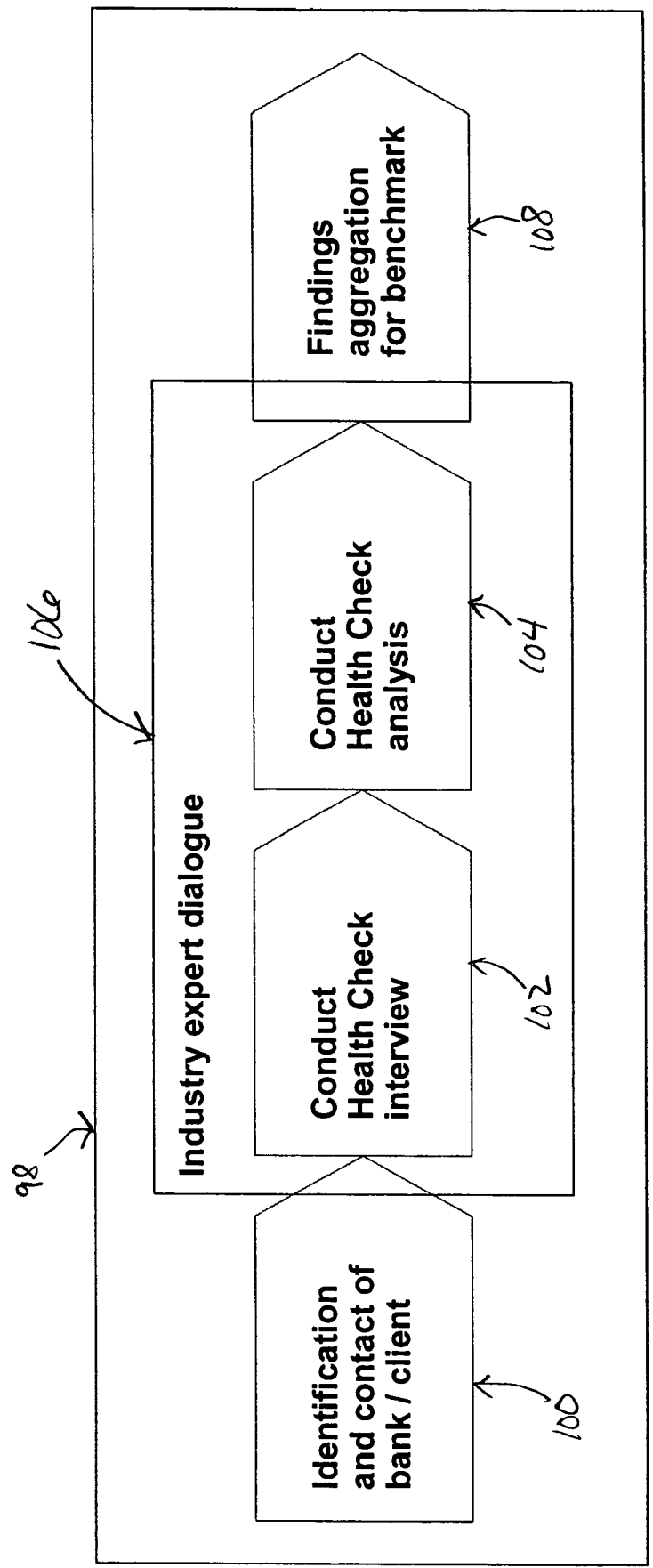
FIG. 3 is a diagram of a consultancy process, showing an interview and an analysis being conducted during the same meeting.

Turning now to FIG. 3, one of the advantages of the above-described method and computerized tool is the ability to complete both the interview and the analysis of a portfolio management process during the same meeting. Traditionally, the consultancy process required at least two separate meetings to complete the process one for the interview and a separate one for reporting the results of the analysis. The need for two separate meetings resulted in numerous problems that made the consulting process inefficient, costly and less than satisfactory for the portfolio manager. By contrast, the new method and computerized tool overcome many of these problems. Thus, in the new consultancy process (98), an industry expert (i.e., typically a bank or other client) is identified and contacted through traditional means (100). The consultant then arranges a meeting with the industry expert (106). During the meeting, the consultant conducts an interview of the industry expert, in which the consultant collects weightings of evaluation categories and responses to evaluation questions from the industry expert (102). The consultant then conducts an analysis of the portfolio management process with a computerized tool using the interview results and reports this analysis to the industry expert (104). By using the computerized analysis tool during the meeting, the consultant is able to conduct both the interview and the analysis during the same meeting instead of having to conduct two separate meetings (106). After the meeting is complete, the consultant may use the findings gathered during the meeting to aggregate the findings with other similar findings to create a benchmark (108).

Turning now to FIG. 4, another advantage of the new method and computerized tool is that the industry expert is able to provide weightings for the evaluation categories before the reports are prepared. Traditionally, the consultant would collect answers to questions, during an interview and use those answers to analyze and prepare reports of the portfolio management process at the consultant's office. However, oftentimes the consultant would find out during the second meeting that the reports lacked credibility with the industry expert because the industry expert was not involved in the analysis process. Thus, the difficulty of involving the industry expert in the analysis process resulted in numerous problems, including wasted consultancy efforts, the generation of unpersuasive reports and the need for additional meetings. In the new consultancy method and computerized tool, the problems associated with not involving the industry expert in the analysis are resolved by collecting weightings of evaluation categories from the industry expert (114). The evaluation categories may be any categories that are useful in evaluating the portfolio management process. For example, in the described embodiment, weightings are collected for each of a series of value chain steps, including profile assessment, asset allocation, asset selection, order generation, and reporting & monitoring (110). Weightings are also collected for an additional set of categories, or performance attributes, that cross over the value chain steps, including automatization, scalability, and out- and insourcing (112).

Turning now to FIG. 5, a diagram of the interview path is shown. During the interview part of the meeting, the consultant will typically follow this structured interview path. The interview path starts with the consultant asking the industry expert a series of questions (120). The interview path is completed when all of the questions have been asked by the consultant and answered by the industry expert (134). The questions that are asked are predetermined and organized into a series of value chain steps that are representative of the major activities of the portfolio management process. Thus, the value chain steps include profile assessment (124), asset allocation (126), asset selection (128), order generation (130), and reporting & monitoring (132). Within each of these value chain steps, a predetermined set of questions are asked that correspond to each of the value chain steps. Thus, a predetermined set of questions corresponding to profile assessment (125), asset allocation (127), asset selection (129), order generation (131), and reporting & monitoring (133) are asked. Thus, the structured interview path typically loops sequentially through all of the questions in each value chain step before proceeding to the next value chain step until all of the questions have been completed (122).

Turning now to FIG. 6, a diagram of the analysis path is shown. The analysis path starts after the interview is complete and all of the interview questions have been completed (140). The analysis path includes separate analyses that are focused on different aspects of the portfolio management process (142). The first analysis is a vertical analysis that evaluates the performance of the portfolio management process within each of the value chain steps (144). The second analysis is a horizontal analysis that evaluates the performance of the portfolio management process in categories that cross over the value chain steps (146). The third analysis is a value tree analysis that groups the responses to the questions into categories for measurement and recommends solutions based on the results of the analysis (148). Once the analysis path is completed, the consultancy process may be completed or the consultant may discuss possible solutions with the industry expert (150).

Turning now to FIGS. 7-20 and particularly to FIG. 7, a computerized tool is provided that may be used in the consultancy process. The tool may be embodied in a spreadsheet program but may also be embodied in other computerized forms as well. The tool begins with a welcome sheet. The welcome sheet describes the purpose of the tool as a way to identify improvement potential within the portfolio management process by comparing the current state of the process with the best practices in the industry (160). The goals of the tool are also described (162). Thus, the bank or client (i.e., the industry expert) receives a neutral evaluation, insights into the best practices in the industry, an identification of improvement potential, and an identification of solutions to improve the process. On the other side, the consultant (i.e., Accenture in this case) gains insight into the client's portfolio management process, receives information that may be used for benchmarking, identifies potential opportunities to provide additional services, and is able to make accurate proposals to the client. The welcome sheet also provides a diagram of the structured consultancy process, which incorporates both the interview and analyses (164). Another diagram is provided that shows how the three different analyses focus on a situation from different aspects (166).

Turning now to FIGS. 8A-8B, the tool also includes a guide or instruction sheet to make it easy for the consultant and the industry expert to use the tool. The guide also helps to maintain structure in the use of the tool. The guide explains that the consultant should perform some of the steps, collect certain data and fill out particular inputs in the tool before the meeting with the client (170). The guide then explains that the remaining steps may be completed during the client meeting. The first step during the client meeting is to complete the client information sheet (172). Next, the general questions sheet is completed (174). The client (i.e., the industry expert) then follows through separate sheets of questions for each of the value chain steps in a structured manner to answer the questions that will be needed for the analysis (176). Next, the tool generates three separate result sheets, or reports, that evaluate the performance of the portfolio management process (178). The results of the evaluation may then be compiled to permit the results to be benchmarked with corresponding results from meetings with other industry experts (180). An analysis sheet is also provided for analyzing the gathered data (182).

Turning now to FIGS. 9A-9C, the client information sheet is shown. The first section of the client information sheet is a client section for basic background information about the industry expert and interview information (190). This information is helpful after the meeting with the industry expert is over to allow the consultant to refer back to the results of the meeting. Throughout the tool, including the client section, inputs are shaded (or colored) to alert the consultant to each of the inputs to ensure that all needed inputs are completed. The next section is an interviewer section (e.g., Accenture) for basic information about the consultant conducting the interview and analysis (192). Again, this section allows the consultant to refer back to the results at a later time. In the next section, the industry expert provides weightings for each of the value chain steps (194). In the embodiment shown, the weightings are subjective weightings of importance to the client but other weightings are also possible. To make it easier for the industry expert to determine an appropriate weighting, the tool accepts each weighting as a rating between 1 and 5. Thus, in the embodiment shown, a rating of 1 corresponds to "not relevant," 2 corresponds to "low importance," 3 corresponds to "medium importance," 4 corresponds to "very important," and 5 corresponds to "critical." Once the weightings are entered into the shaded inputs, the tool converts the ratings into percentages. The converted percentages correspond to the ratings as follows: 1=0%, 2=25%, 3=50%, 4=75%, and 5=100%. After the weightings for each of the value chain steps are inputted, weightings for additional (i.e., "horizontal") evaluation categories are determined by the industry expert (196). The additional evaluation categories cross over the value chain steps and are rated and entered like the weightings for the value chain steps described above.

Turning now to FIGS. 10A-10D, the general questions sheet is shown. The general questions sheet contains more detailed background questions about the portfolio management process being evaluated. Many of these questions do not directly relate to the value chain steps, which as described below have their own structured set of questions. One of the purposes of these questions is to enable the consultant to better understand the type of industry involved and group, or cluster, the particular portfolio management process with processes of other companies in the same industry. In addition, the general questions can be used to identify a consultant who specializes in a particular industry that matches the expert's industry. This is especially helpful during early stage meetings with a new industry expert where the initial consultant may need to seek out a new and/or additional consultant who specializes in a particular field. The questions may be answered by either the industry expert (e.g., "int") or by the consultant (e.g., "acn") depending on who is better prepared to answer the questions (200). As noted in the guide sheet and at the bottom of the general questions sheet, some of these questions may be answered before the meeting or they may be answered during the interview. As with the other sheets and sections, the answers are entered in shaded inputs (202). To help organize the general questions, the questions are structured within groups. For example, the following groups of questions may be used: "How is the bank/client organized?" (204); "What products are they offering?" (206); "What is the structure of the assets?" (208); "Do you know how much each customer costs you in each value chain step?" (210); "Do you know how much you earn per customer in each value chain step?" (212); "Distribution" (214); "What kind of software solutions do you have?" (216). After each group of questions, a comment area is provided to enter any general or specific comments that either the consultant or industry expert wishes to record. The general questions may also be used to prepare the industry expert for the specific questions associated with each value chain step and to better analyze the responses to the value chain step questions.

Turning now to FIGS. 11A-11C, the profile assessment sheet is shown. The profile assessment sheet includes all of the inputs that are related to the first value chain step (i.e., profile assessment). The sheet contains a series of questions that touch on various aspects of the profile assessment value chain step. The questions and inputs are structured to assist the consultant and the industry expert in easily completing all of the needed inputs. The questions are first grouped into separate statements that broadly describe the type of questions within each group (220). Preferably, a word or phrase is bolded or highlighted in each statement to assist in easy cross referencing between the questions and the reports. Within each statement, a series of primary questions are provided to which responses are required from the industry expert (222). A set of additional questions are also provided for each primary question (224). The additional questions are not intended to be directly answered. Instead, the additional questions provide context and related issues for the industry expert to consider in determining the appropriate responses to the primary questions. A comment area is also provided within each statement next to the questions so that any general or specific comments that the consultant or industry expert may have may be recorded (226). In addition, a solution area is provided in which common solutions are listed that correspond to either the entire statement or to particular questions (228). The listed solutions help the industry expert better understand the purpose of the questions and may provide the consultant with an opportunity to discuss possible solutions with the industry expert during the interview process and before conducting the analysis.

The industry expert's responses to the questions are entered into the evaluation column as ratings similar to the ratings for the weightings described above (230). Thus, as shown at the bottom of the sheet, 1 corresponds to "not considered within firm;" 2 corresponds to "client's level: low;" 3 corresponds to "client's level: medium;" 4 corresponds to "client's level: above average;" and 5 corresponds to "client's level: best practice" (264). The tool then converts the entered ratings into percentages like described above, where 1=0%, 2=25%, 3=50%, 4=75%, and 5=100%. A weighting for each of the question responses is also provided (234). These weightings are typically predetermined and are usually equally proportioned between each of the questions in the group. For example, in the case of the first statement (240), which has three primary questions, the weighting of each of the three responses is equally proportioned at 33% each, thus equaling a total 100% for the group. In order to accommodate additional flexibility and further involvement by the industry expert, the question weightings can be adjusted by the industry expert and/or consultant if desired. This option is identified by shading the weighting column with a different type of shading or coloring. If an adjustment is desired, the predetermined weighting is typed over with the new weighting.

The tool then calculates a weighted percentage for each question response by multiplying the converted percentages with the question weightings (236). The weighted percentages for each question response is then added together within the group to calculate a total weighted percentage for the result statement. Thus, for the first statement the total weighted percentage is 100% (241). The industry expert is also given the opportunity to change the weighting that was previously assigned to the profile assessment value chain step on the client information sheet (238). Accordingly, the previously determined category weighting is shown again in an input box in the profile assessment sheet. If the industry expert chooses to change this weighting, the previously determined weighting can be typed over to enter a new weighting. This option is useful because it is likely that the industry expert may decide to change the weighting after seeing the specific questions posed in the value chain step sheet. This option also invites additional involvement by the industry expert. To complete the entire sheet, the consultant and industry exert proceed through the sheet to respond to all of the questions. After all of the questions have been responded to, the tool calculates total weighted percentages (241, 243, 245, 247, 249, 251, 253) for each of the statements (240, 242, 244, 246, 248, 250, 252).

At the bottom of the sheet, the data from the sheet is collected together for graphing the results. Accordingly, the first column of the collected data is the shorthand phrases that correspond to each of the statements (256). The second column of data is the total weighted percentages (258). The total weighted percentages are also averaged to calculate an averaged weighted percentage (259). The third column of data is the weight assigned to the value chain step (the assigned weight is copied to match the number of statements) (260). A questions and comments area is also provided for any general or specific comments that the consultant and/or industry expert wish to record (262).

Figure 12A:
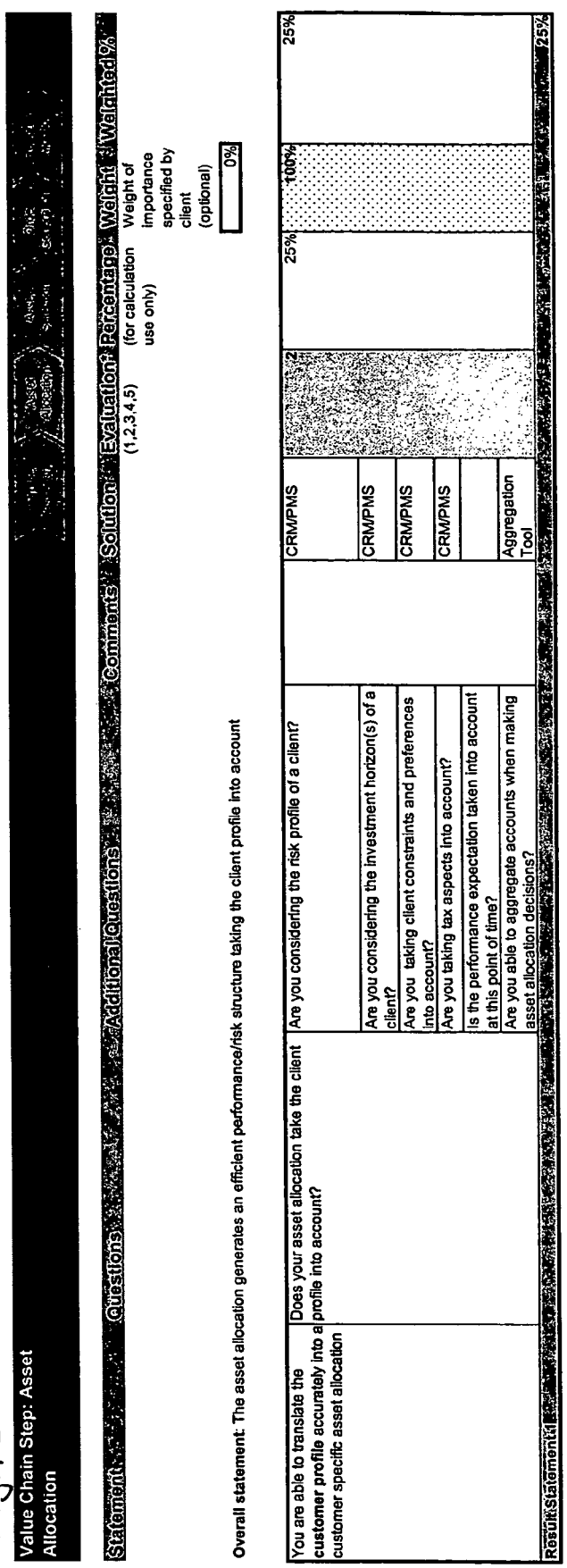
Figure 12C:
Figure 14A:
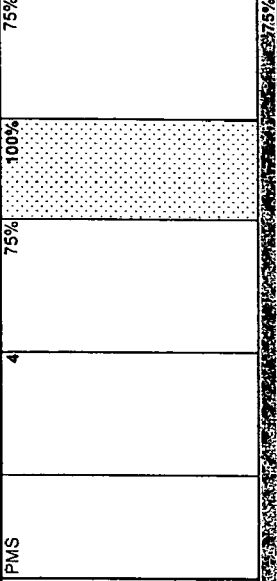

Turning now to FIGS. 12A-12C, 13A-13C, 14A-14C and 15A-15C, the question sheets for the other value chain steps are shown. These sheets are substantially similar to the profile assessment sheet described above, thus further detailed textual description of each sheet is unnecessary. FIGS. 12A-12C show the asset allocation sheet and the corresponding questions, responses, weightings and so forth. FIGS. 13A-13C show the asset selection sheet and the corresponding questions, responses, weightings and so forth. FIGS. 14A-14C show the order generation sheet and the corresponding questions, responses, weightings and so forth. FIGS. 15A-15C show the report & monitoring sheet and the corresponding questions, responses, weightings and so forth. In light of the detailed textual description already provided, those skilled in the art will readily appreciate the differences between each of the sheets from the figures alone without additional textual description.

Figure 16:
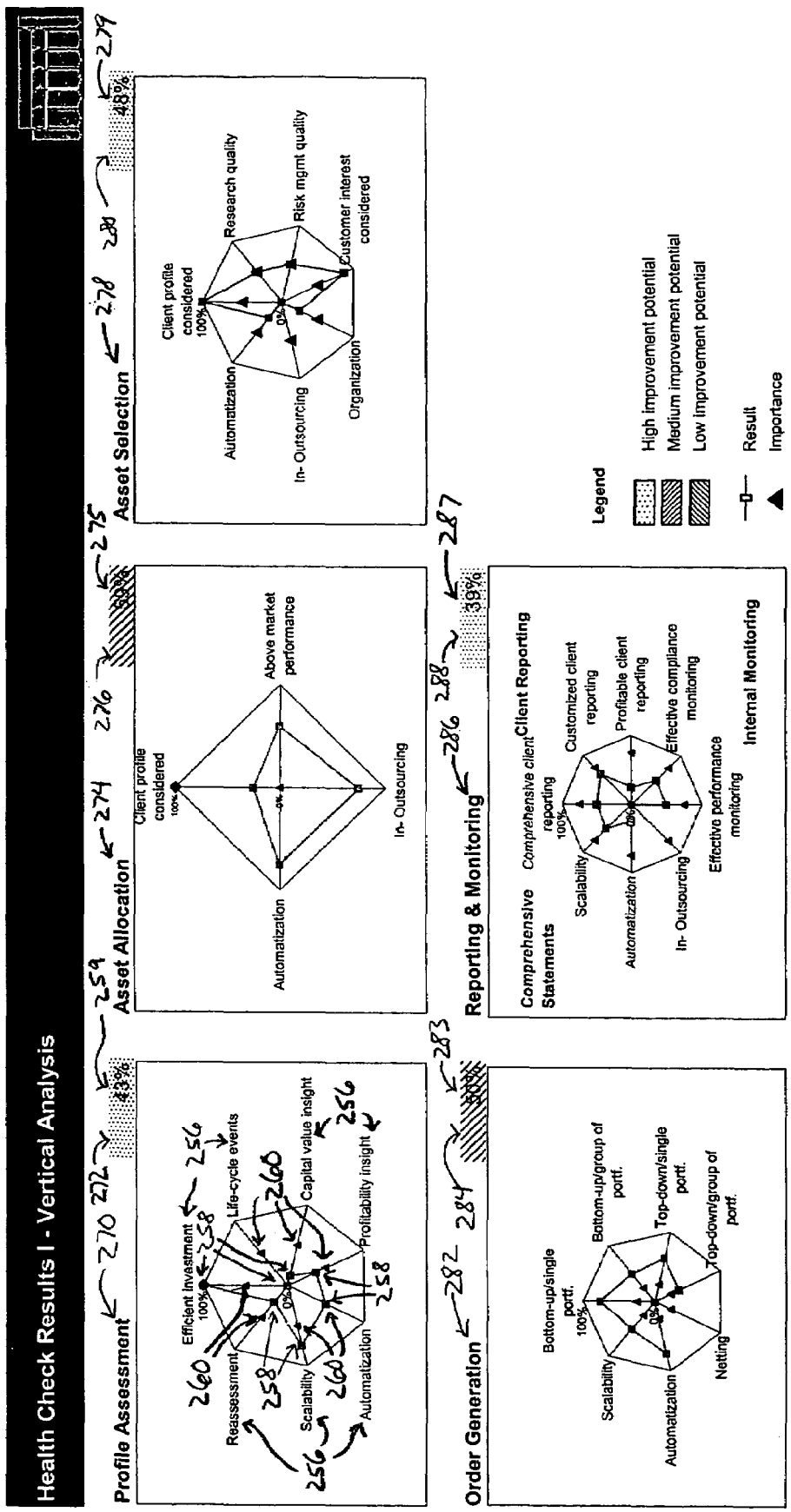
FIG. 16 is a screen display of the computerized tool, showing a vertical analysis sheet.

Turning now to FIG. 16, a vertical analysis sheet is shown. The vertical analysis sheet includes an analysis for each of the value chain steps. Each of the analyses are shown on the same sheet for easy comparisons. Although various analyses and graphs are possible, radar graphs as shown provide useful reports of the analyses. For example, the profile assessment graph (270) uses the shorthand statements (256) from the profile assessment sheet for the axes of the graph. The total weighted percentages for each statement are then plotted on the graph (258). The weight assigned to the profile assessment value chain step is also plotted on each axis (260). This analysis provides a convenient graphical report that enables the consultant and industry expert to quickly identify the strengths and weaknesses of the portfolio management process. Generally speaking, when the plotted weighted percentages (258) are located inside of the plotted assigned weight (260), an inconsistency is identified between the actual portfolio management process and the importance assigned by the industry expert. These inconsistencies provide an opportunity for further investigation in search of improvement potential. The analysis also includes the numerical value of the averaged weighted percentage for the value chain step (259). In order to alert the consultant and industry expert to particular analyses, a flag is tied to the averaged weighted percentage (272). The flag may be different types of shading corresponding to predetermined ranges of percentages or may be different colors. Thus, in the example of profile assessment, the averaged weighted percentage is 43% (259) which results in a flag alerting that the value chain step has high improvement potential (272). The analyses of the remaining value chain steps follow a similar format. For example, in the asset allocation report (274) the averaged weighted percentage is 59% (275) which is flagged as medium improvement potential (276). In the asset selection report (278) the weighted percentage is 48% (279) which is flagged as high improvement potential (280). In the order generation report (282) the weighted percentage is 50% (283) which is flagged as medium improvement potential (284). In the reporting & monitoring report (286) the weighted percentage is 39% (287) which is flagged as high improvement potential (288). By comparing the graphs with the value chain step sheets, it can be readily seen that the axes of each report correspond to the statements from the value chain step sheets.

Figure 17:
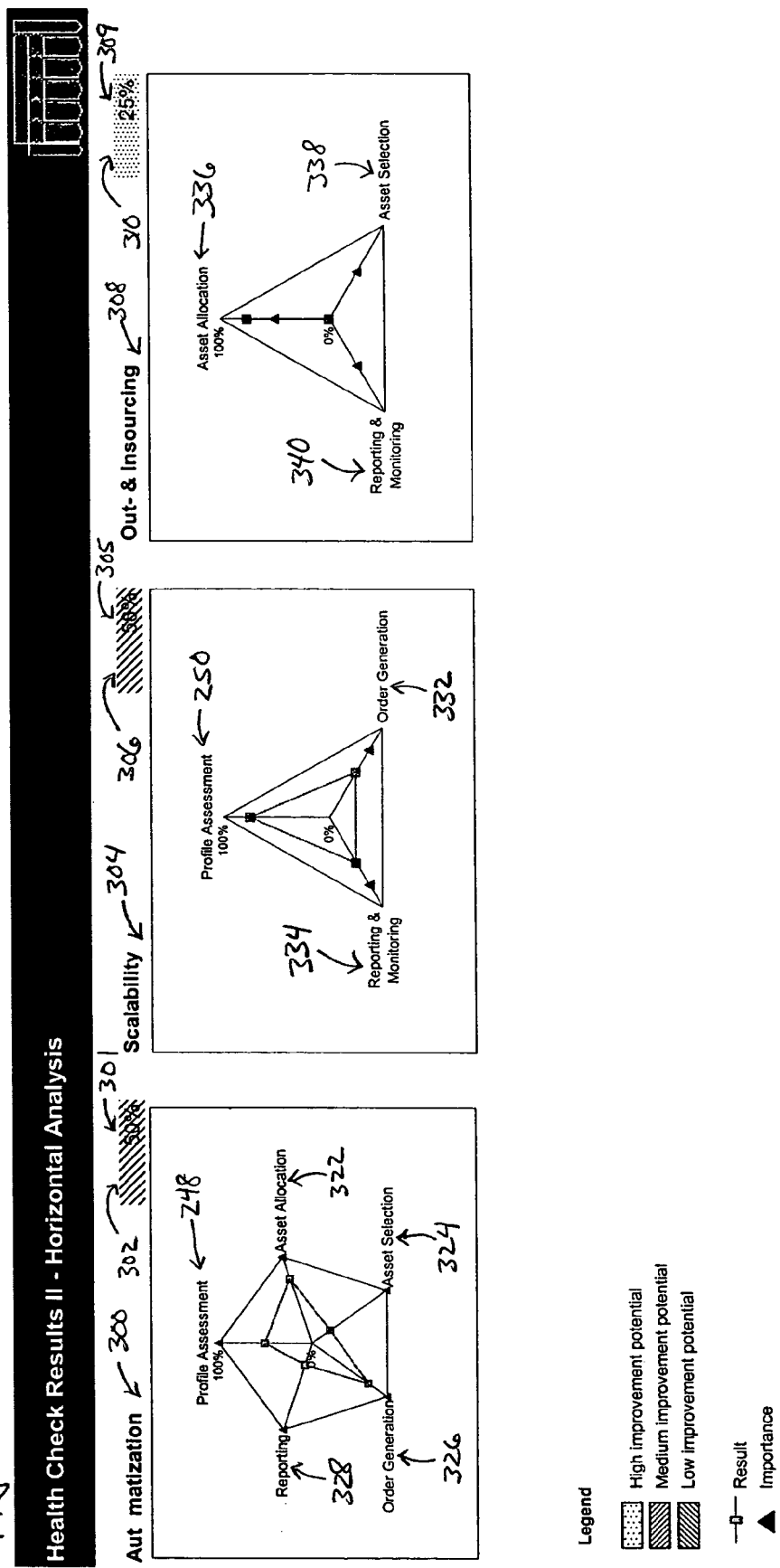
FIG. 17 is a screen display of the computerized tool, showing a horizontal analysis sheet.

Turning now to FIG. 17, a horizontal analysis sheet is shown. The horizontal analysis sheet includes three separate analyses that cross over the value chain steps. Each of the analyses is reported as a radar graph similar to the vertical analysis reports described above. In the case of the automatization report (300), the axes are statements related to automatization that were included in the groups of questions in the value chain steps. For example, the axis and data for profile assessment (248) come from the automatization statement in the profile assessment value chain step (i.e., statement no. 5). The axis and data for asset allocation (322) come from the automatization statement of the asset allocation value chain step (i.e., statement no. 4). The axis and data for asset selection (324) come from the automatization statement of the asset selection value chain step (i.e., statement no. 7). The axis and data for order generation (326) come from the automatization statement of the order generation value chain step (i.e., statement no. 6). The axis and data for reporting step (328) come from the automatization statement of the report & monitoring value chain step (i.e., statement no. 7). The analyses and reports for scalability and out-and insourcing are similarly constructed, thus further textual description is unnecessary. In order to make generation of the horizontal reports easier, the data for the graphs is gathered together on the analysis sheet as shown at FIG. 20D. The horizontal reports also include averaged weighted percentages and flags like the vertical reports discussed above. Thus, in the case of the automatization report, the averaged weighted percentage is 50% (301), resulting in a flag indicating "medium improvement potential" (302). In the case of the scalability report, the averaged weighted percentage is 58% (305), resulting in a flag indicating "medium improvement potential" (306). In the case of the out- & insourcing report, the averaged weighted percentage is 25% (309), resulting in a flag indicating "high improvement potential" (310).

Figure 18:
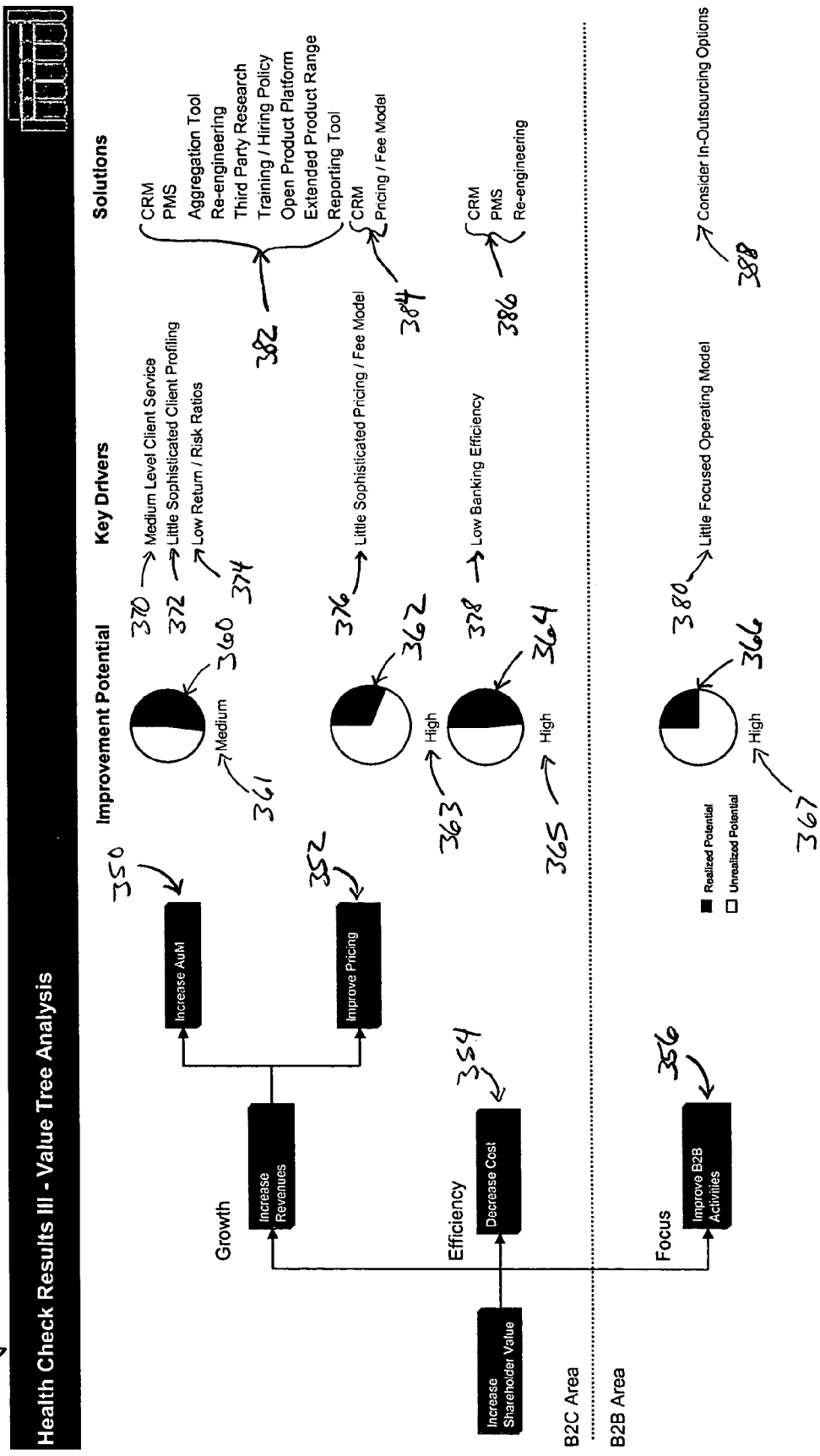
FIG. 18 is a screen display of the computerized tool, showing a value tree analysis sheet.

Turning now to FIG. 18, a value tree analysis sheet is shown. The value tree analysis provides a report that groups the statements from different value chain steps into measurement categories. For example, in the embodiment shown, the measurement categories are defined as "increase AuM" (i.e., assets under management) (350), "improve pricing" (352), "decrease costs" (354), and "improve B2B activities" (i.e., business to business) (356). In order to simplify the analysis necessary to generate the value tree report, the data is gathered together on the analysis sheet shown in FIGS. 20A-20C. For example, in FIGS. 20A-20B, one can see how different statements (402) are grouped from the value chain steps (400) to form the measurement categories. The analysis sheet also gathers the averaged weighted percentages for each of the statements from the respective value chain step sheets (404). A percentage weighting is also provided for each of the statements (406). As shown in FIGS. 20A-20B, the percentage weighting for each statement is preferably 100% to provide an equal averaging over all of the grouped statements, but the actual percentage weighting can be changed if so desired. The analysis sheet sums the averaged weighted percentages (404) and the percentage weightings (406) to calculate a total (408). The total averaged weighted percentage is then divided by the total percentage weighting to calculate the realized potential (410). Next, the realized potential is subtracted from 100%, thereby providing both the realized potential and the unrealized potential (360). Thus, for the measurement category "increase AuM", the realized potential is calculated to be 52% and the unrealized potential is calculated to be 48% (360). These potentials are then reported as a pie chart on the value tree analysis sheet shown in FIG. 18. Similarly, the realized and unrealized potentials for the measurement category "improve pricing" (352) are calculated and reported to be 31% and 69%, respectively (362). The realized and unrealized potentials for the measurement category "decrease cost" (354) are calculated and reported to be 48% and 52%, respectively (364). The realized and unrealized potentials for the measurement category "improve B2B activities" (356) are calculated and reported to be 25% and 75%, respectively (366).

A textual flag is also provided for each pie chart based on calculated effectivity results. The effectivity results are calculated on the analysis sheet as shown in FIG. 20C. In the case of the measurement category "increase AuM," three different effectivity results are calculated to reflect different aspects of the category. For example, the first effectivity result is calculated as an average of the statements "customer interests," "comprehensive reporting," "customer reporting," "compliance monitoring," and "performance monitoring" from the category "increase AuM" (see FIG. 20A). The first effectivity result is thus 60% (420). The second effectivity result is calculated as an average of the statements "risk/return profile, preferences and constraints," "life cycle events," "capital value insights," "performance data used for reassessment," and "client profile taken into account" from the category "increase AuM." The second effectivity result is thus 48% (422). The third effectivity result is calculated as an average of the statements "customer profile used for AA," "above average performance," "high research quality," and "risk management (diversification)" from the category "increase AuM." The third effectivity result is thus 46% (424). Because the measurement category "increase AuM" includes three different effectivity results, the three effectivity results are averaged to calculate a total effectivity result (426). Therefore, the textual flag for "increase AuM" (361) is based on the total effectivity result (426). In the case of the other measurement categories, the effectivity results are not subdivided and the previously calculated realized potentials are used directly as the effectivity results (428, 430, 432). Accordingly, for the measurement category "increase AuM" the flag indicates medium (361); for the measurement category "improve pricing" the flag indicates high (363); for the measurement category "decrease cost" the flag indicates high (365); and for the measurement category "improve B2B activities" the flag indicates high (367).

The effectivity results shown in FIG. 20C are also used as the basis for the lists of key drivers and solutions on the value tree analysis report shown in FIG. 18. Thus, in the case of the list of key drivers, each of the effectivity results (420, 422, 424, 428, 430, 432) are compared to a minimum (434) and maximum (436) range to determine which descriptive key driver to list (370, 372, 374, 376, 378, 380). In the case of the list of solutions, if the effectivity results (426, 428, 430, 432) are less than 75%, then all of the solutions are listed (382, 384, 386, 388).

Turning to FIG. 19, the benchmark sheet is shown. The benchmark sheet provides a convenient location to collect all of the relevant results from the interview and analysis. This data may then be copied from the worksheet after the meeting with the industry expert to a central storage location for comparison with similar results from meetings with other industry experts using the same tool and consultancy process. Comprehensive benchmarks may then be developed by collecting data in a consistent structure from many companies and/or industry experts.

Turning to FIGS. 20A-20D, the analysis sheet is shown. The analysis sheet is used to gather most of the analysis calculations together in one convenient location. Since the consultant and the industry expert will be mostly interested in the generated reports, there will usually be no need for viewing the analysis sheet. Since the details of the analysis sheet have been thoroughly described above, further textual description is unnecessary.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

We claim:

1. A computer-based method for evaluating portfolio management, comprising:
    interviewing a portfolio management industry expert thereby collecting:
        A) a weighting determined by said industry expert for each of a plurality of evaluation categories before asking evaluation questions associated with said evaluation categories, wherein said evaluation categories comprise categories of value chain steps and performance attributes, and
        B) responses from said industry expert to said evaluation questions, wherein said evaluation questions comprise groups of questions organized within each of said value chain steps and wherein some of said evaluation questions within said value chain steps are directed to said performance attributes and are interspersed across said groups of questions;
    inputting said weightings and said responses into a computer analysis tool;
    analyzing said responses to said evaluation questions in response to said weightings of said evaluation categories using said computer analysis tool for each of said value chain steps and said performance attributes;
    generating a computer generated analysis comprising:
        a value chain analysis for each of said value chain steps comparing an aggregate response value corresponding to said responses to said evaluation questions within each value chain step to the weighting associated with each value chain step that is determined by said industry expert; and
        a performance attribute analysis separate from the value chain analysis that is generated for each of said performance attributes comparing an aggregate response value corresponding to said responses to said evaluation questions that are interspersed across said groups of questions to the weighting associated with each performance attribute that is determined by said industry expert, said interspersed evaluation questions thereby being included in both said value chain analyses and said performance attribute analyses; and
    reporting said computer generated analysis to said industry expert contemporaneously with an interview of said industry expert that comprises said interviewing step, said inputting step and said analyzing step, wherein immediate results are provided to said industry expert and wherein scenarios of said weightings and said responses are immediately comparable.

2. The computer-based method according to claim 1, wherein said computer generated analysis further comprises a value tree analysis, said value tree analysis grouping said responses to said evaluation questions from different categories of said evaluation categories into one of a plurality of_measurement categories thereby combining said grouped responses into an effectivity result for each measurement category, wherein weightings from said industry expert for each of said measurement categories are not input into said computer analysis tool, said value tree analysis further comprising recommended solutions based on said effectivity result.

3. A computer-readable medium storing a program, said program directing a computer to analyze an interview and report results by executing the steps comprising:
    receiving a weighting input for each of a plurality of evaluation categories, said evaluation categories being categories of a portfolio management process and including at least value chain steps comprising profile assessment, asset allocation, asset selection, order generation, and reporting and monitoring and performance attributes comprising automatization, scalability, and outsourcing and insourcing;

receiving response inputs to evaluation questions, said evaluation questions being questions about the performance of said portfolio management process, wherein said evaluation questions comprise groups of questions organized within each of said value chain steps and wherein some of said evaluation questions within said value chain steps are directed to said performance attributes and are interspersed across said groups of questions, and wherein predetermined weightings of said evaluation questions are changeable on the same screen display that receives said response inputs;

analyzing said response inputs to said evaluation questions in response to said weighting inputs of said evaluation categories; and generating a plurality of reports based on said analyzing step, said plurality of reports comprising:

reports for each of said value chain steps that compare an aggregate response value corresponding to said response inputs to said evaluation questions within each value chain step to the weighting input associated with each value chain step;

reports for each of said performance attributes that compare an aggregate response value for each performance attribute of said response inputs to said evaluation questions that are interspersed across said groups of questions with the weighting input associated with each performance attribute, said interspersed evaluation questions thereby being included in said reports for both said value chain steps and said performance attributes; and a value tree report comprising groupings of some of said response inputs to said evaluation questions from different categories of said evaluation categories into measurement categories thereby combining said grouped responses into an effectivity result for each measurement category, and comprising a list of key drivers or recommended solutions based on a comparison of said effectivity results and predetermined values for each measurement category; and outputting plurality of reports comprising an automatic flag for each report identifying levels of improvement potential, wherein said reports are outputted to be reviewable contemporaneously with an interview of an industry expert, thereby providing immediate results to said industry expert and wherein scenarios of said weighting inputs and said response inputs are immediately comparable.

4. The computer-based method according to claim 2, wherein said value chain steps comprise profile assessment, asset allocation, asset selection, order generation, and reporting and monitoring, and said performance attributes comprise automatization, scalability, and outsourcing and insourcing, wherein predetermined weightings of said evaluation questions are changeable in response to a determination by said industry expert, wherein each of said computer generated analyses comprises an automatic graphical flag identifying a level of improvement potential, further comprising collecting said responses to said evaluation questions thereby bench marking said responses with responses to a same set of evaluation questions from another industry expert, and further comprising collecting responses from said industry expert to benchmarking questions, wherein said benchmarking questions cluster and segment a company of said industry expert.

* * * * *